CHECKING CIRCUIT

Filed Oct. 27, 1954 12 Sheets-Sheet 1

INVENTOR.
WILLIAM J. DEERHAKE
CHARLES R. BORDERS
BYRON L. HAVENS
BY Wesley De Bruin
ATTORNEY March 11, 1958 W. J. DEERHAKE ET AL 2,826,359
CHECKING CIRCUIT
Filed Oct. 27, 1954 12 Sheets-Sheet 2
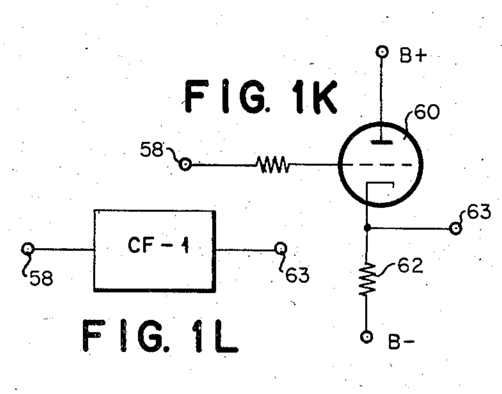
FIG. 1K, FIG. 1L
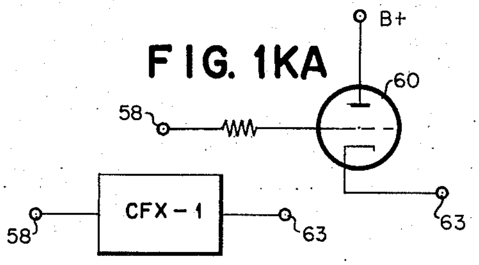
FIG. 1KA
FIG. 1LA
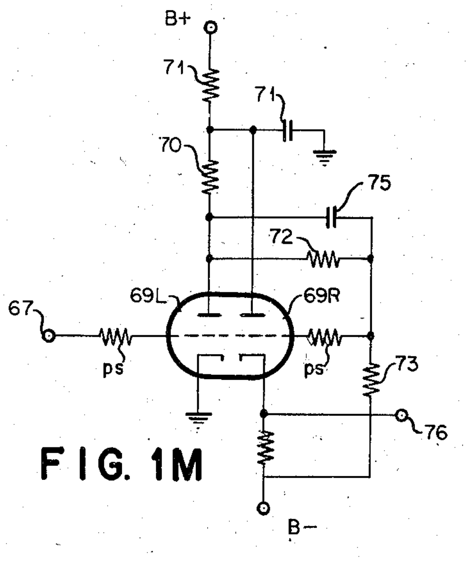
FIG. 1M
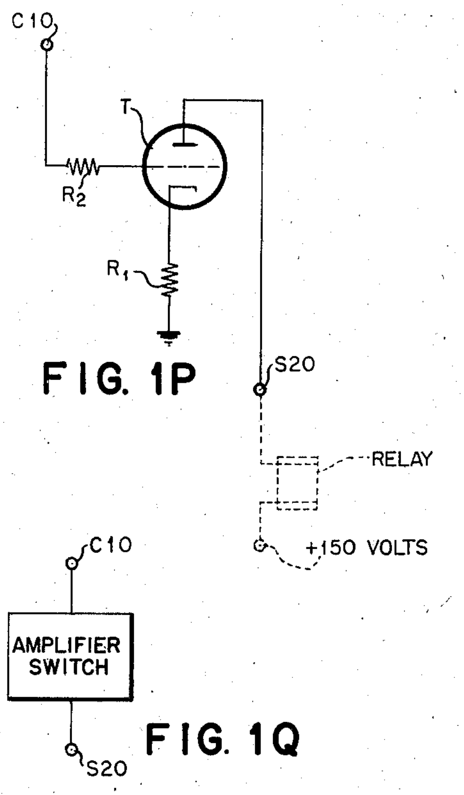
FIG. 1P, FIG. 1Q
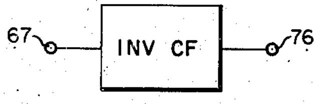
FIG. 1N
INVENTOR.
WILLIAM J. DEERHAKE
CHARLES R. BORDERS
BYRON L. HAVENS
BY Wesley De Bruin
ATTORNEY

CHECKING CIRCUIT

Filed Oct. 27, 1954 12 Sheets-Sheet 3

INVENTOR.
WILLIAM J. DEERHAKE
CHARLES R. BORDERS
BYRON L. HAVENS

BY Wesley De Bruin
ATTORNEY

INVENTOR.
WILLIAM J. DEERHAKE
CHARLES R. BORDERS
BYRON L. HAVENS
BY Wesley De Bruin
ATTORNEY INVENTOR.
WILLIAM J. DEERHAKE
CHARLES R. BORDERS
BYRON L. HAVENS
BY Wesley De Bruin
ATTORNEY

CHECKING CIRCUIT

Filed Oct. 27, 1954 12 Sheets-Sheet 6

INVENTOR.
WILLIAM J. DEERHAKE
CHARLES R. BORDERS
BYRON L. HAVENS

BY Wesley De Bruin
ATTORNEY

CHECKING CIRCUIT

INVENTOR.
WILLIAM J. DEERHAKE
CHARLES R. BORDERS
BYRON L. HAVENS
BY
Wesley De Bruin
ATTORNEY

INVENTOR.
WILLIAM J. DEERHAKE
CHARLES R. BORDERS
BYRON L. HAVENS

BY Wesley De Bruin
ATTORNEY

INVENTOR.
WILLIAM J. DEERHAKE
CHARLES R. BORDERS
BYRON L. HAVENS

BY Wesley De Bruin
ATTORNEY

INVENTOR.
WILLIAM J. DEERHAKE
CHARLES R. BORDERS
BYRON L. HAVENS
BY Wesley De Bruin
ATTORNEY INVENTOR.
WILLIAM J. DEARHAKE
CHARLES R. BORDERS
BYRON L. HAVENS
BY Wesley De Bruin
ATTORNEY March 11, 1958 W. J. DEERHAKE ET AL 2,826,359

CHECKING CIRCUIT

Filed Oct. 27, 1954 12 Sheets-Sheet 12

INVENTOR.

WILLIAM J. DEERHAKE
CHARLES R. BORDERS
BYRON L. HAVENS

BY Wesley De Bruin
ATTORNEY 2,826,359

CHECKING CIRCUIT

William J. Deerhake, Dumont, Charles R. Borders, Alpine, and Byron L. Havens, Closter, N. J., assignors to International Business Machines Corporation, New York, N. Y., a corporation of New York Application October 27, 1954, Serial No. 465,076

20 Claims. (Cl. 235—61)

This invention relates to electronic code error checking apparatus and more particularly to apparatus for determining and indicating where the error occurred.

In the solution of a problem using digital computing apparatus, usually a number of operations involving a large amount of coded information are performed in order to obtain a result. Of course, it is desirable to have an accurate result and also to, if possible, detect any error while the computing apparatus is functioning on a problem. Thereby subsequent time is saved wherein the machine would have continued operating to an erroneous result. Also, the point at which an error occurs permits of facilitates the location of the faulty functioning equipment.

Thus, it is very desirable to provide some means of detecting the errors at the time the error is made. Many of the errors that are made occur in the transfer of information from one piece of equipment in a machine to another. The reading or writing of information on magnetic tape, or on magnetic drums, and in high speed storage units are responsible for many of the errors occurring in a machine. These errors are caused primarily by such things as poor signals in the medium itself, amplifier troubles, faulty gate tubes, diodes, and transients, to name only a few. Errors also may occur in arithmetical operations but these appear to occur less frequently than the afore-recited type.

The novel checking circuit herein disclosed and claimed will detect errors due to any of the afore-recited reasons or other reasons, when the erroneous information is impressed upon a plurality of data lines connecting various components of a high speed computer and a high speed storage unit. A large percentage of these errors which occur in the transfer of information in a machine or calculator can be detected soon after they occur. The checking circuit herein disclosed finds particular application, but is not limited to the detection of errors resulting from the withdrawal of information from a high speed storage unit. Further, the novel checking circuit will detect errors that exist in information that is stored, or that is to be introduced or stored in the high speed storage unit. Many applications of the novel apparatus other than the particular application inherent in the disclosed embodiment will be apparent to those skilled in the art.

Calculators of the type wherein the novel checking circuit herein disclosed would find particular application, receive information commonly referred to as information or instruction words in the binary, binary-decimal excess three or like system. The words in the embodiment hereindisclosed are multi-digit words having four binary-decimal digits for each decimal position. That is, each decimal position has four binary-decimal digits; 1, 2, 4 and 8. However, the decimal value represented in the binary-decimal notation within each decimal position is equal to or less than 9.

Each word consisting of a plurality of decimal digits has an indicator. The indicator, i. e., the indicated bit count, bears a definite mathematical relationship to the information or instruction word and is expressed in coded notation. It is unnecessary for a complete understanding of the novel checking circuit herein disclosed, to define the mathematical relationship of the indicator and its instruction word. However, the indicator, its mathematical relationship to the instruction word and how it is utilized in one instance to render a check on the accuracy of the representation of the instruction or information word is clearly and fully set forth in U. S. patent application Serial No. 434,548 of W. J. Deerhake et al. filed on June 4, 1954, and entitled "Checking Circuit."

The novel checking circuit herein disclosed and claimed checks information that appears on a plurality of data lines. These data lines convey information to and from cathode ray tube storage and to and from various components including registers within the calculator. The checking circuit may be thought of as having two portions, each performing a check and each utilized with additional apparatus when an error is detected to render visual indications that will permit the operator to determine in many instances where the error occurred and in all instances, the address (or location in storage) of the error. The two portions of the checking circuit referred to above, may for convenience, be referred to as a Modulo 2 checking circuit and a Modulo 4 checking circuit.

The Modulo 4 checking circuit is disclosed and claimed in U. S. patent application Serial No. 434,548 of W. J. Deerhake et al. filed on June 4, 1954, and entitled "Checking Circuit." From a review of the Deerhake et al. application, it willl be apparent that the device disclosed therein has utility in apparatus other than that employed herein to disclose the present invention.

The Modulo 2 checking circuit may be thought of as consisting of sixty-six Modulo 2 latches. The sixty-six Modulo 2 latches are thoroughly discussed hereinafter.

The high speed storage unit may be of the type disclosed and claimed in U. S. patent application, Serial No. 444,253 filed July 19, 1954, and entitled "Electrostatic Storage System."

For purposes of clarity and consistency a number of definitions of terminology and symbols will be set forth:

In the binary notation only two digits are employed, i. e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16, etc., respectively. For example, binary number 1001 represents decimal digit 9 which is determined by the addition of decimal digits 1 and 8 indicated by a binary 1 in the extreme right and left binary positions respectively. Hence, by using binary bits or pulses in groups of four wherein a pulse represents a binary 1 and the absence of a pulse represents a binary 0, any decimal digit from 0–9 inclusive may be written in the pure binary notation.

The system of representnig decimal numbers, digit for digit, in the pure binary notation is referred to herein as the binary-decimal system. The four consecutive binary orders, reading from right to left, represent the decimal digits 1, 2, 4 and 8 for the units decimal order and are accordingly referred to as the 1 bit, 2 bit, 4 bit and 8 bit, respectively. It follows that the four binary orders of the tens decimal order represent the decimal digits 10, 20, 40 and 80 respectively. Likewise, in subsequent decimal orders, for example, the four respective binary orders of the hundreds decimal order represent the decimal digits 100, 200, 400 and 800 respectively.

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0–15 inclusive can be represented by a group of four binary bits. However, in the binary-decimal system, only the decimal digits (0–9 inclusive) are represented by each group of four binary bits.

Various circuits used herein or particular points within the circuits are frequently referred to as Up or Down. Up means that the voltage present at the particular point or at the output of the circuit designated is positive with respect to ground. Down means that the voltage present at the particular point or at the output of the circuit designated is negative with respect to ground. If the control grid of a vacuum tube is referred to as Down, it means that the voltage at that control grid is below the cutoff value for the vacuum tube.

Numerous coincidence circuits are employed herein. An And circuit refers to a circuit which is operable to produce a positive voltage at its output terminal only when all of the input terminals thereof have a positive voltage applied thereto simultaneously. An Or circuit refers to a circuit operable to produce a positive voltage at its output terminal when only one or a plurality of the input terminals thereof has a positive voltage applied thereto.

When a terminal is referred to as being Up the presence of a binary 1 is indicated. Correspondingly, when a terminal is represented as Down the absence of a binary 1 is indicated, i. e., the presence of a binary 0.

The primary object of the present invention is a checking circuit for use in high speed data handling apparatus that is capable of rapidly and accurately detecting an error and rendering a visual indication indicative of the location of the particular item of data that is in error.

A second object of the present invention is a checking circuit that is particularly adapted for use with a high speed storage unit and upon detection of an error will give an indication as to where the erroneous information is or was contained in storage.

A further object of the present invention is a Modulo 2 checking circuit that is fast, accurate and simple to construct.

A still further object of the present invention is a checking device that utilizes a checking circuit of the general type disclosed in U. S. patent application Serial No. 434,548 in conjunction with a Modulo 2 checking circuit and accurately indicates where an error, if any, has occurred in the information stored in the storage system of the general type disclosed in U. S. patent application Serial No. 444,253, filed July 19, 1954.

A still further object of the present invention is a checking circuit that may be utilized with any one of a number of coded data systems and is fast, accurate and reliable in operation.

Other objects of the invention will be pointed out in the following description and claims and illustrated in the accompanying drawings, which disclose, by way of example, the principle of the invention and the best mode, which has been contemplated, of applying that principle.

Figures 1A, 1B, 1C, 1D:
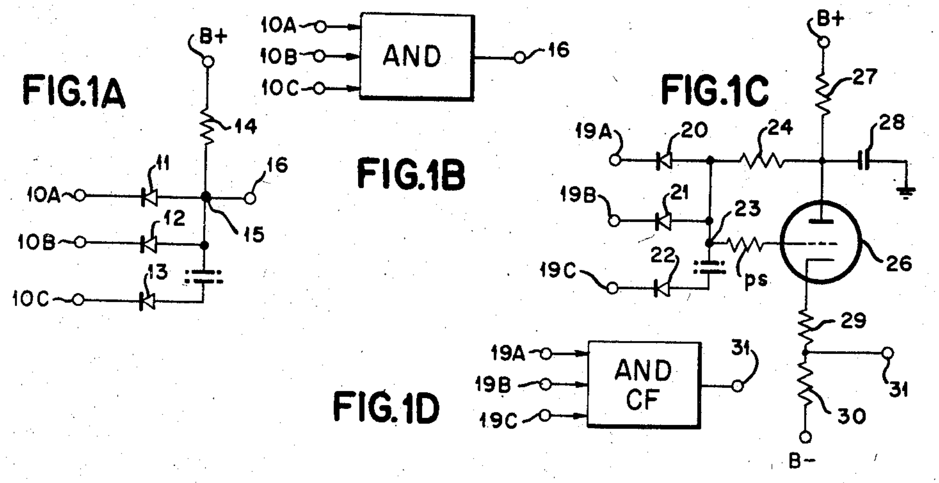
Fig. 1A is a circuit diagram of an And circuit.
Fig. 1B is a block diagram representation of the And circuit of Fig. 1A.
Fig. 1C is a circuit diagram of an And circuit of the cathode follower type.
Figures 1E, 1F:
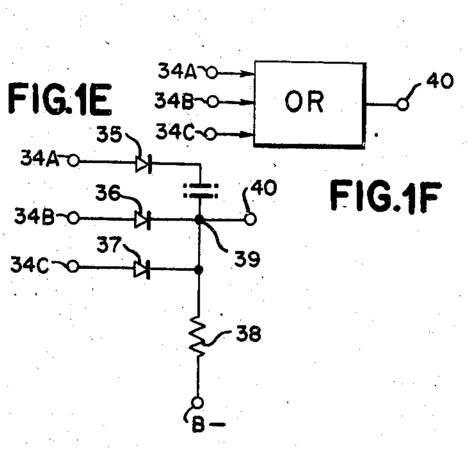
Figure 1G:
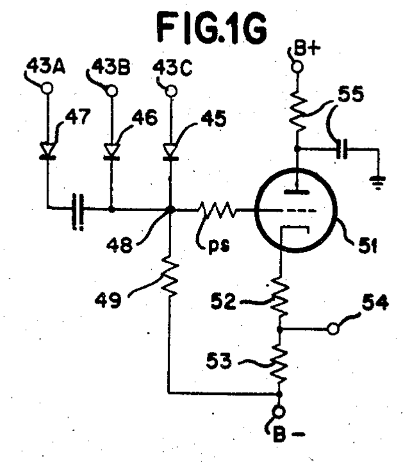
Figure 1H:
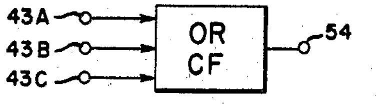
Figures 1I, 1J:
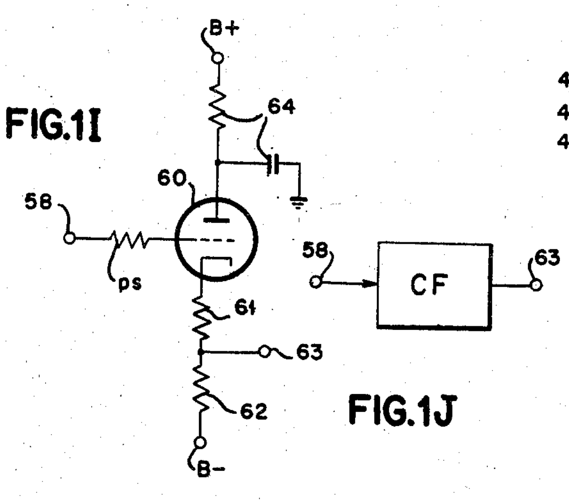
Figures 1R, 1S, 1T:
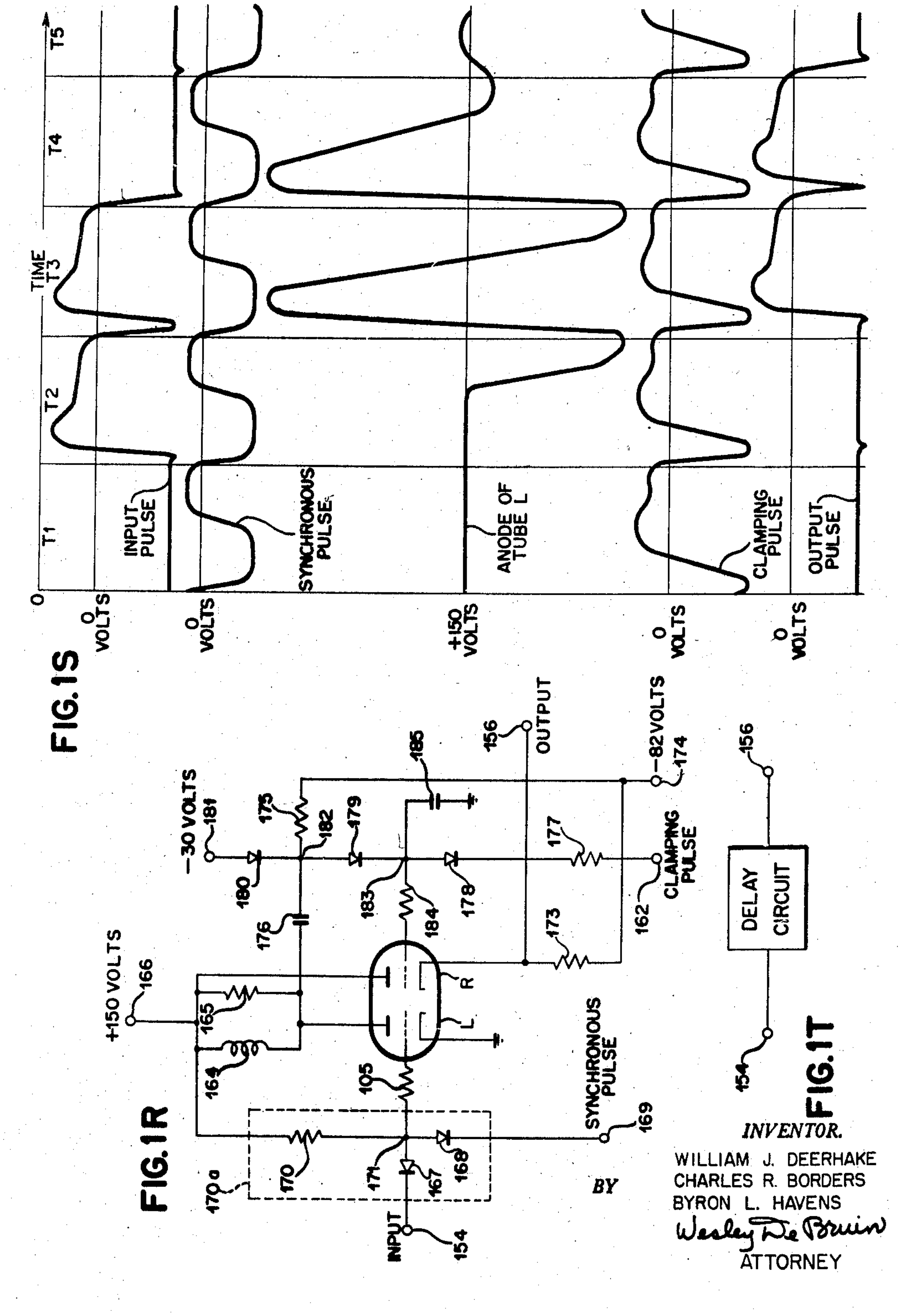
Figure 1U:
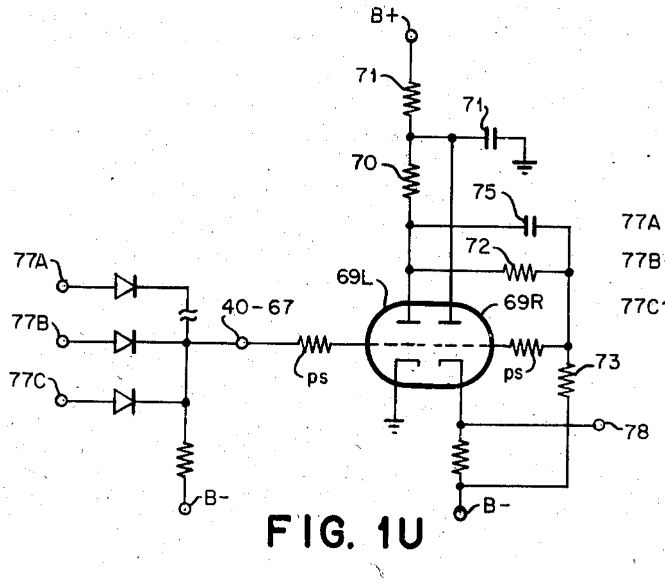
Figure 1V:
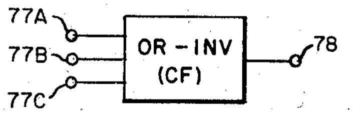
Figure 1W:
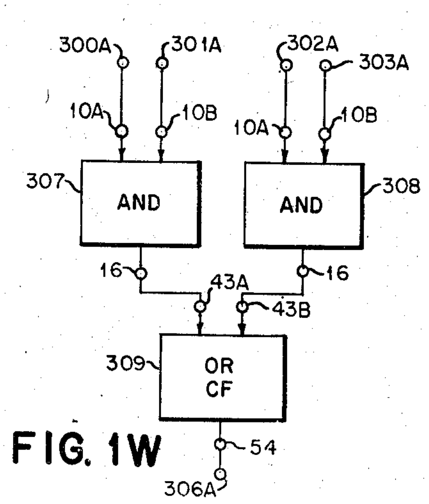
Figure 1X:
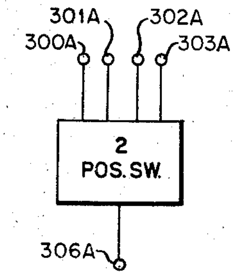
Figure 1Y:
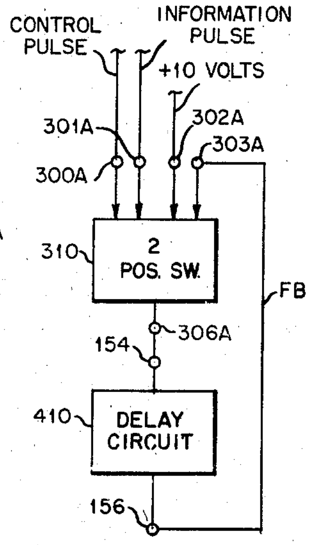
Figure 1C:
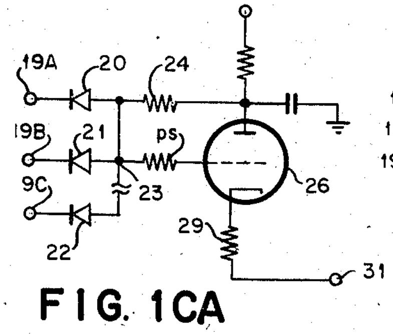
Figure 1D:
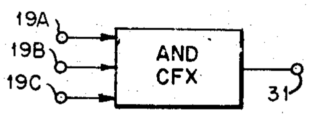
Figure 2A:
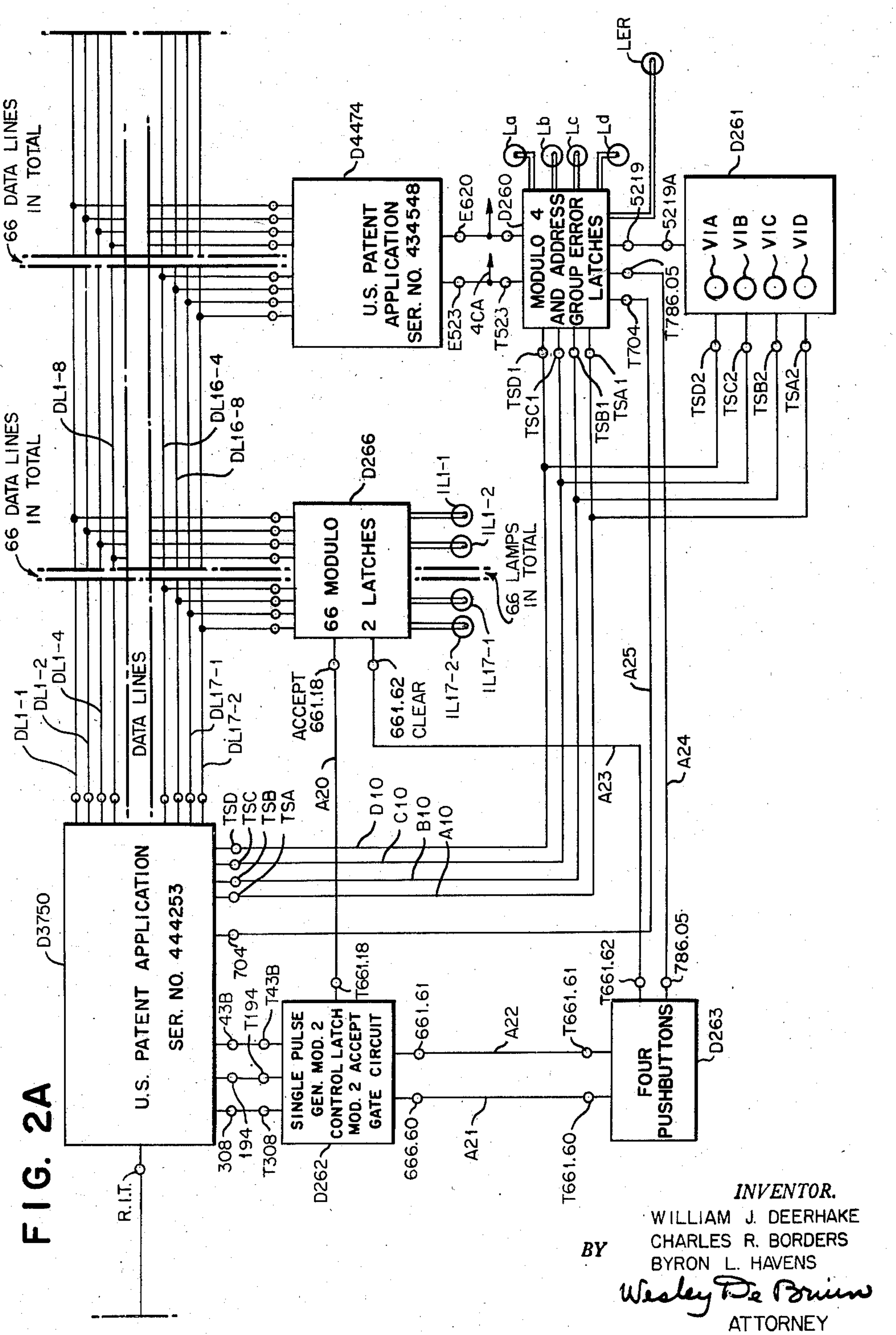
Figure 3:
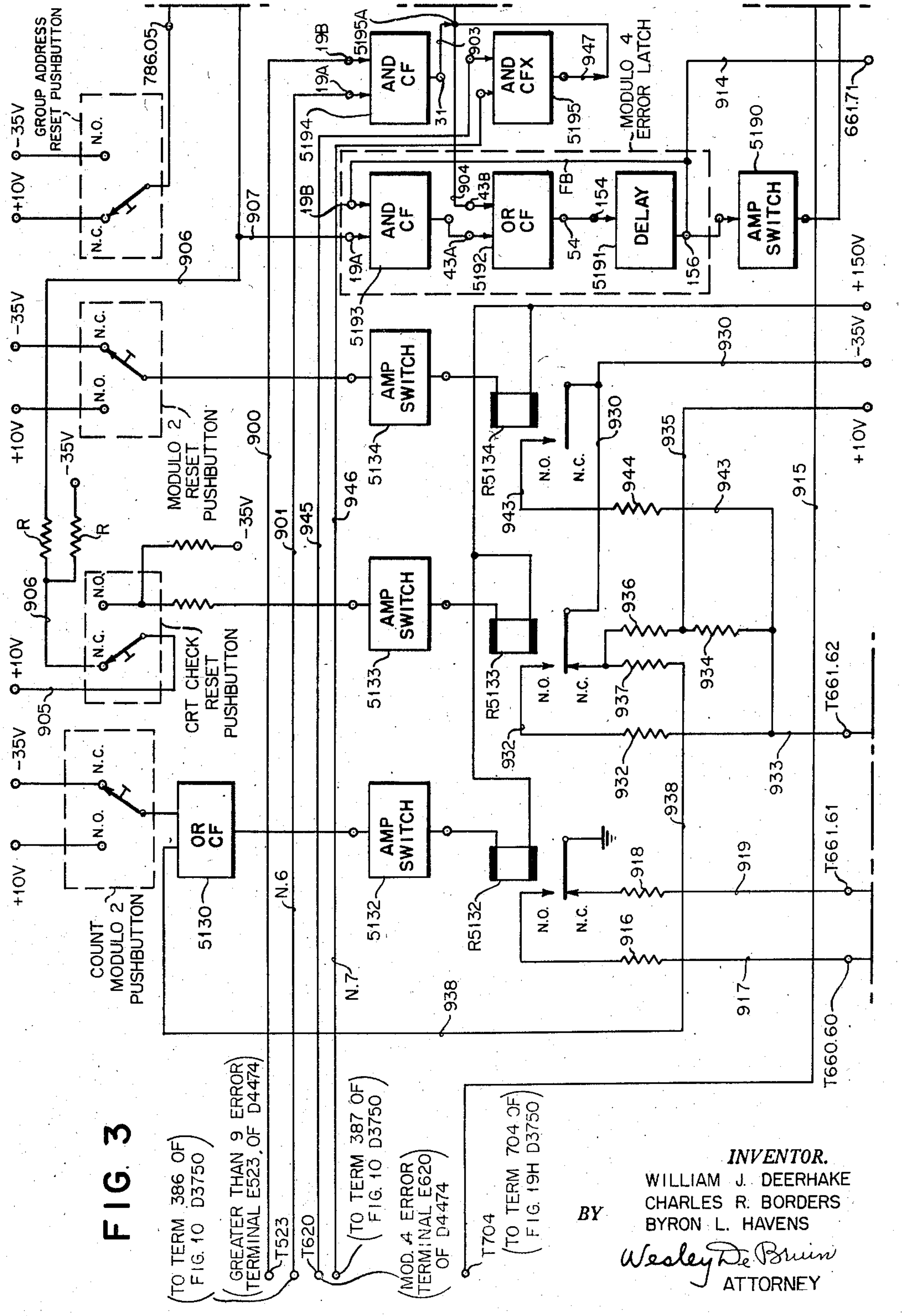
Figure 4:
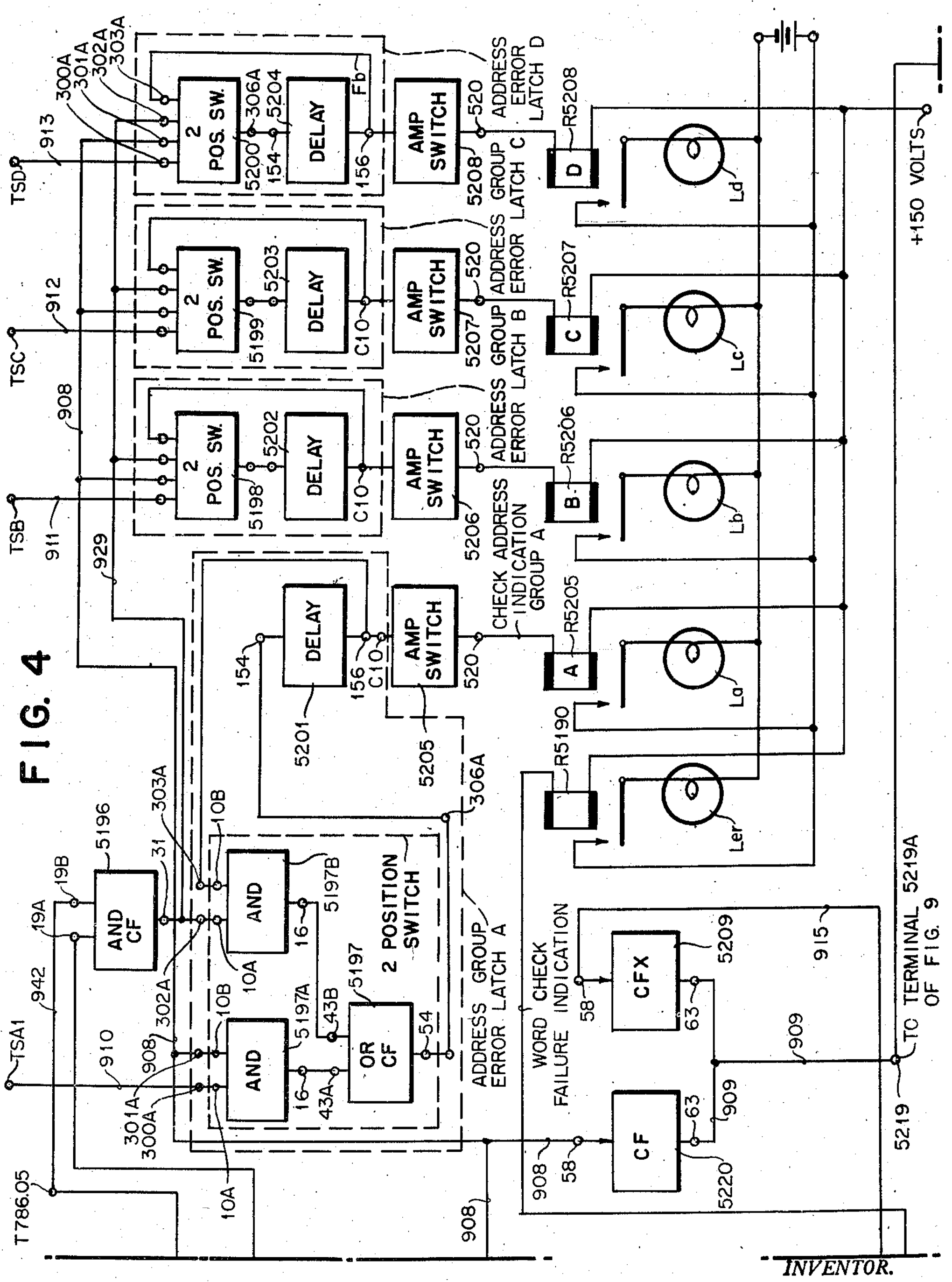
Figure 5:
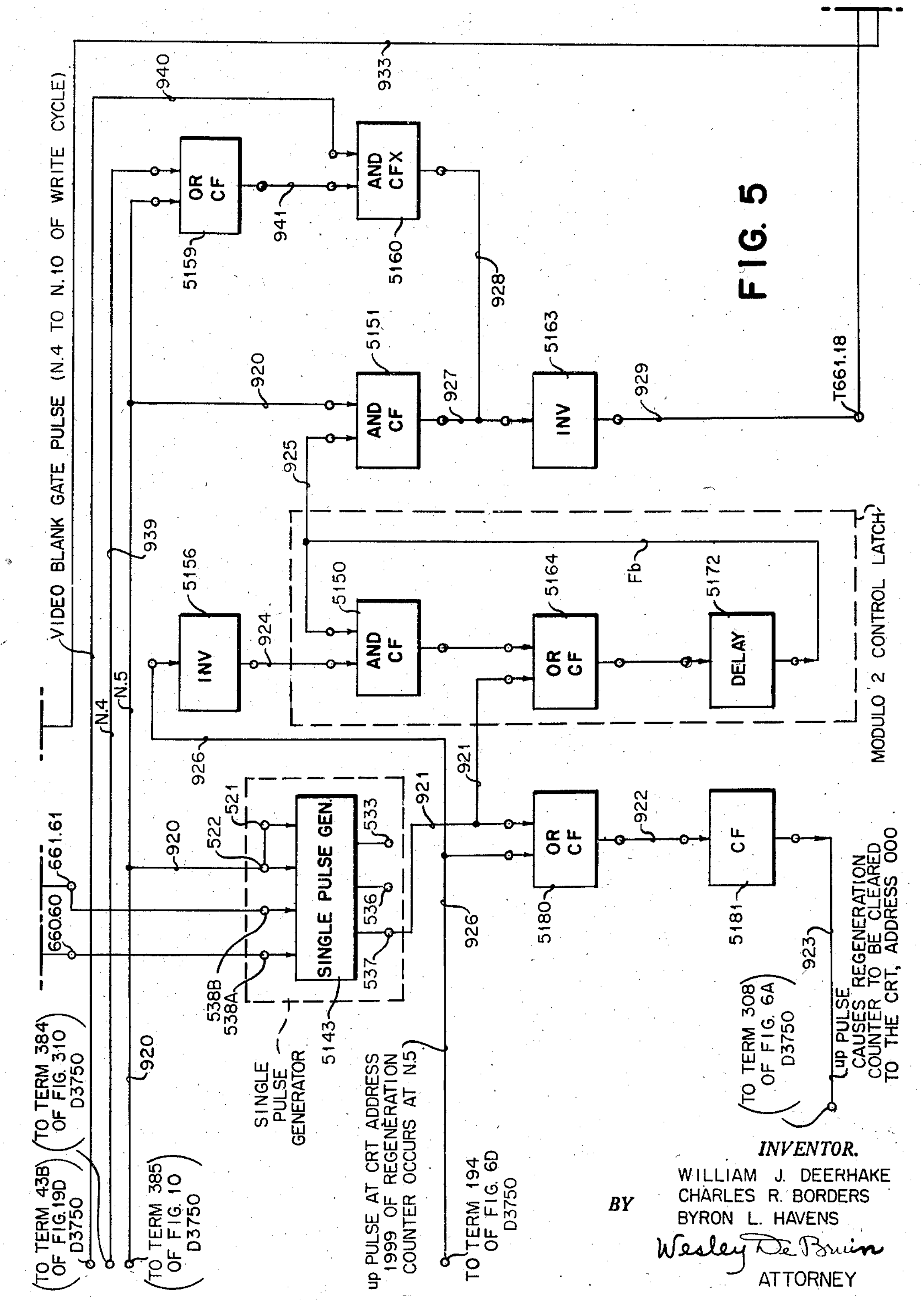
Figures 6, 7:
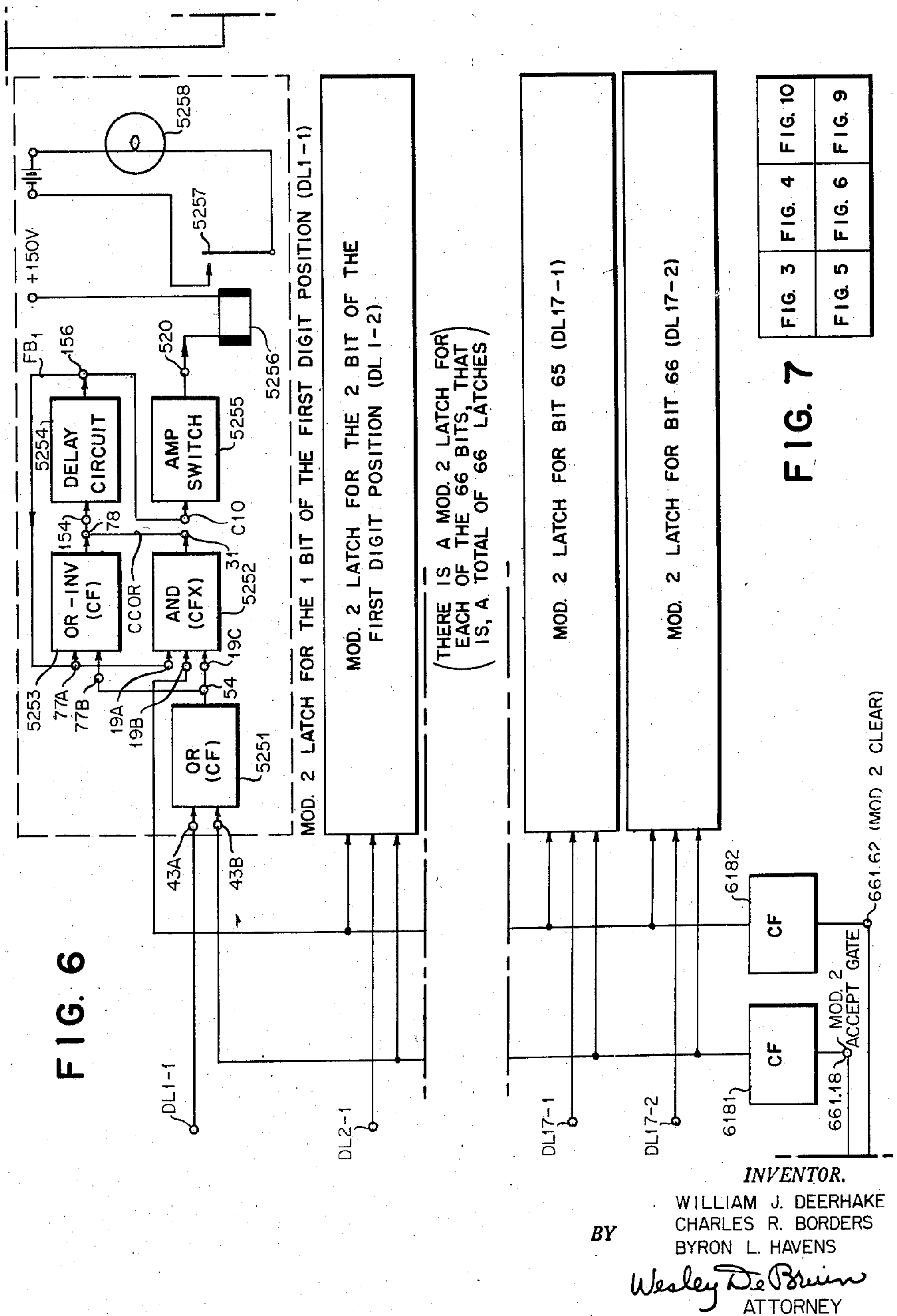
Figures 8, 8A, 8B, 8C, 8D, 8E:
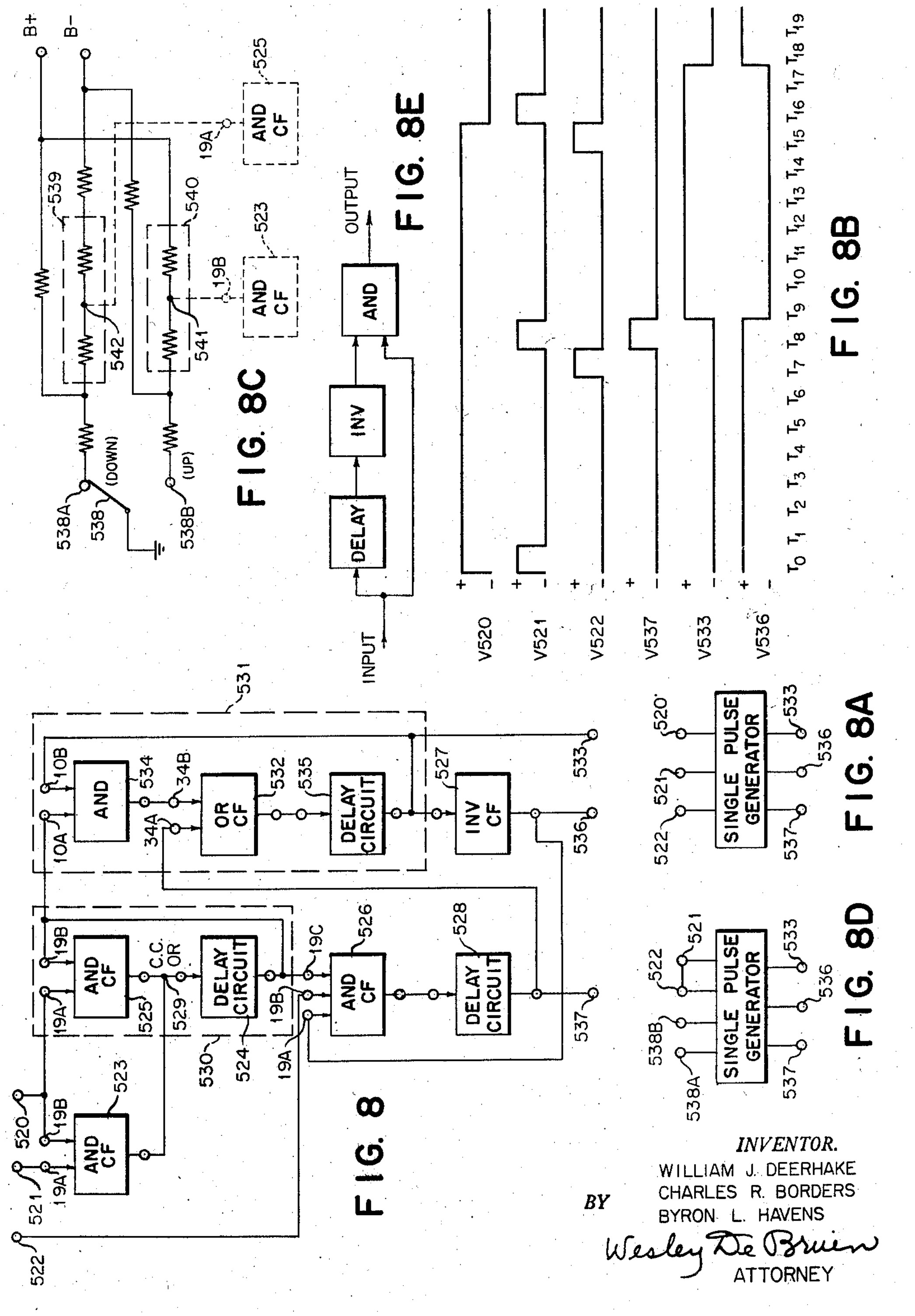
Figures 9, 9A:
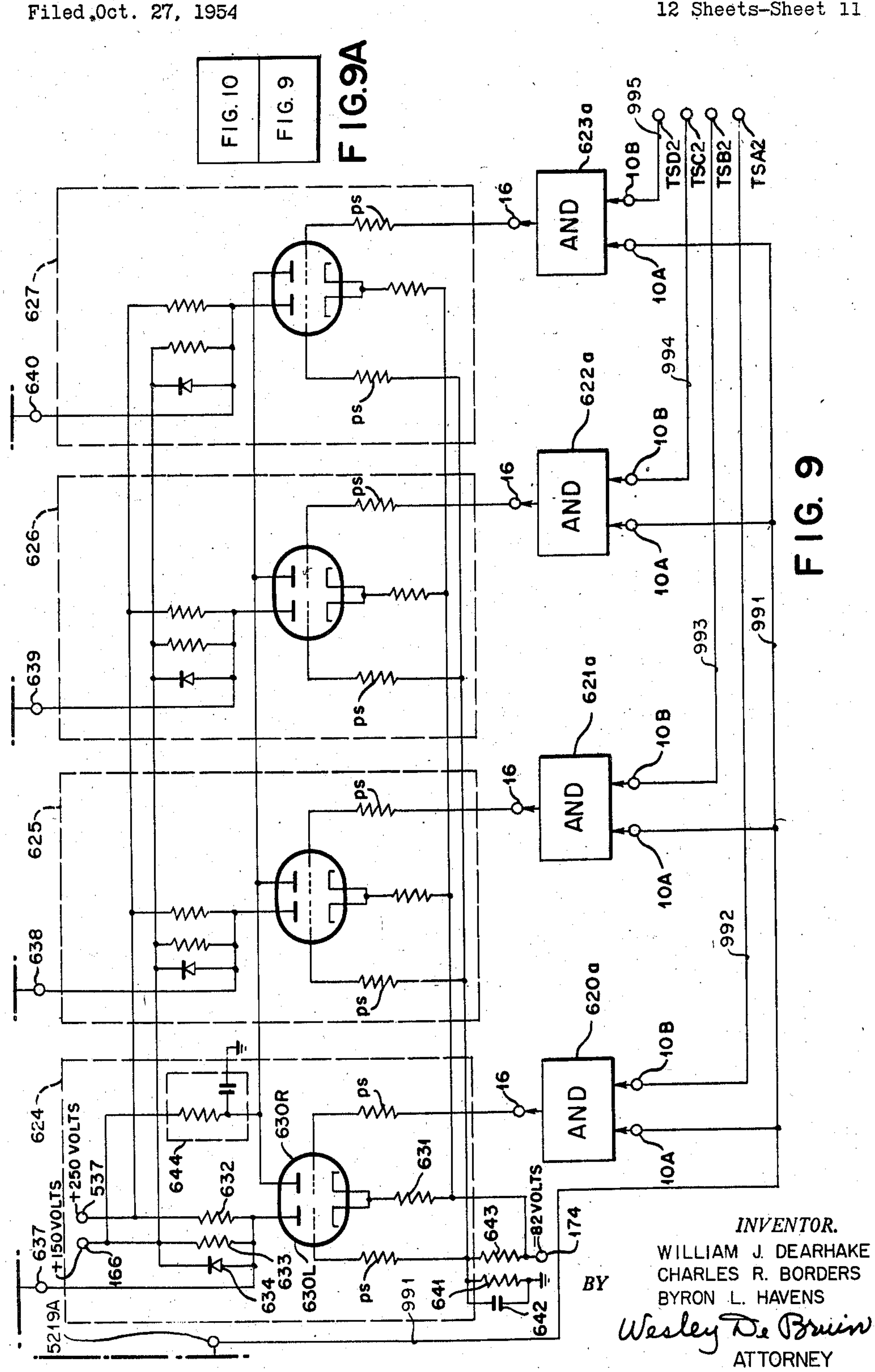
Figure 10:
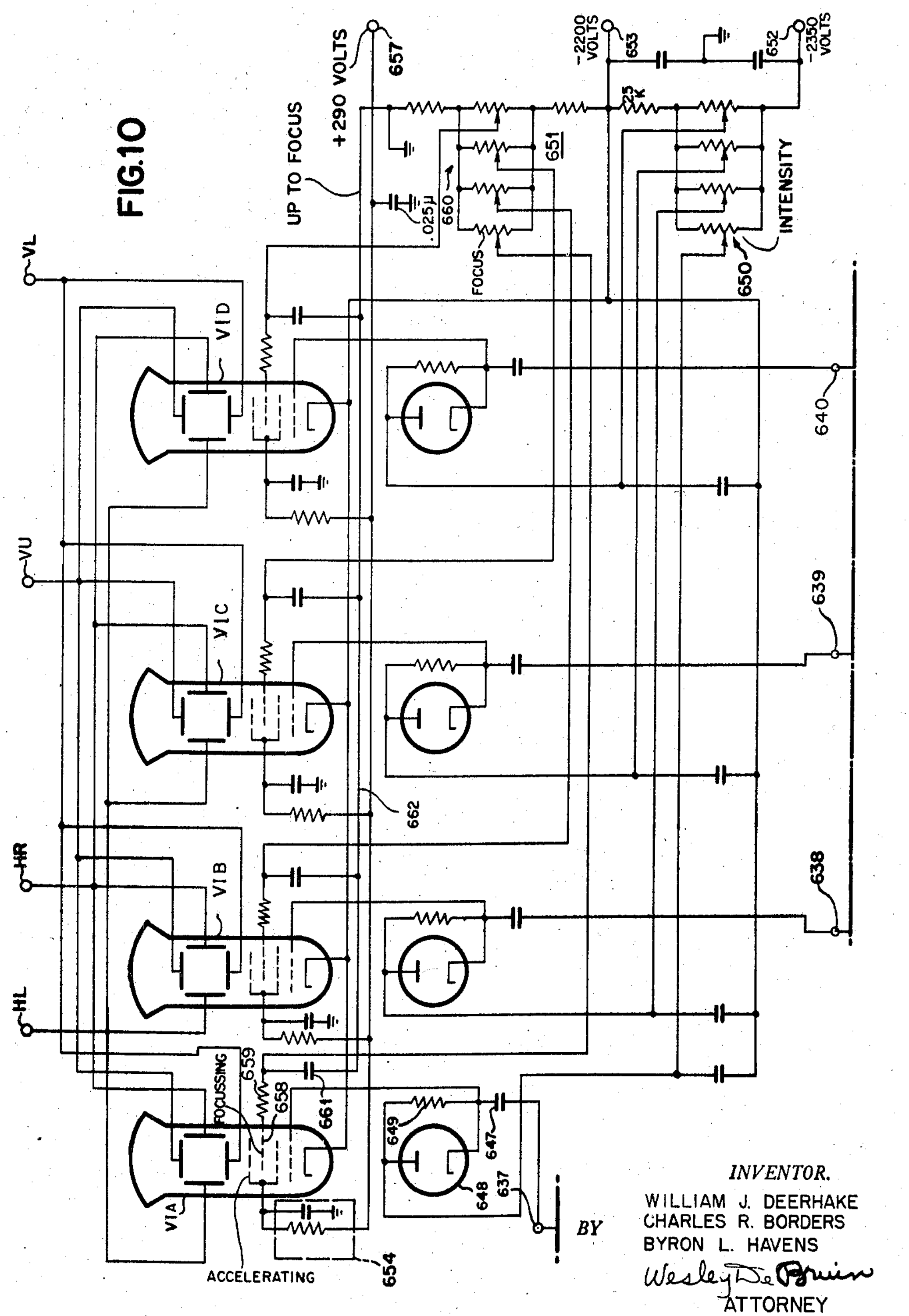

Fig. 1CA is an And circuit very similar to, and usually used in conjunction with, the And circuit of Fig. 1C;

Fig. 1D is a block diagram representation of the And circuit of Fig. 1C;

Fig. 1DA is a block diagram representation of the And circuit of Fig. 1CA;

Fig. 1E is a circuit diagram of an Or circuit;

Fig. 1F is a block diagram representation of the Or circuit of Fig. 1E;

Fig. 1G is a circuit diagram of an Or circuit of the cathode follower type;

Fig. 1H is a block diagram representation of the Or circuit of Fig. 1G;

Fig. 1I is a circuit diagram of a cathode follower;

Fig. 1J is a block diagram representation of the cathode follower of Fig. 1I;

Fig. 1K is a circuit diagram of an alternative embodiment of the cathode follower of Fig. 1I;

Fig. 1KA is a cathode follower very similar to, and usually used in conjunction with, the cathode follower circuit of Fig. 1K;

Fig. 1L is a block diagram representation of the cathode follower of Fig. 1K;

Fig. 1LA is a block diagram representation of the cathode follower circuit of Fig. 1KA;

Fig. 1M is a detailed circuit diagram of an inverter circuit;

Fig. 1N is a block diagram representation of the inverter circuit of Fig. 1M;

Fig. 1P is a circuit diagram of an amplifier switch;

Fig. 1Q is a block diagram representation of the amplifier switch of Fig. 1P;

Fig. 1R is a circuit diagram of a delay circuit;

Fig. 1S discloses a number of voltage waveforms employed in the explanation of the delay circuit of Fig. 1R;

Fig. 1T is a block diagram representation of the delay circuit of Fig. 1R;

Fig. 1U is a detailed circuit diagram of an Or-inverter;

Fig. 1V is a block diagram representation of the Or-inverter circuit of Fig. 1U;

Fig. 1W is a block diagram representation of a two-position switch;

Fig. 1X is a block diagram used to represent the two-position switch of Fig. 1W;

Fig. 1Y is a latch circuit employing a two-position switch and a delay circuit;

Fig. 2A is a block diagram representation of the novel error detecting and visual indicating apparatus herein disclosed and claimed;

Fig. 3 is a portion of the composite of Fig. 7 of the novel checking apparatus herein disclosed and claimed;

Fig. 4 is another portion of the composite of Fig. 7;

Fig. 5 is another portion of the composite of Fig. 7;

Fig. 6 is another portion of the composite of Fig. 7;

Fig. 7 is a showing of how Figs. 3, 4, 5, 6, 9 and 10 are to be joined in order to disclose the entire novel checking apparatus;

Fig. 8 is a logical circuit diagram of the single pulse generator utilized in the novel checking apparatus shown in Fig. 7;

Fig. 8A is a block diagram representation of the single pulse generator of Fig. 8;

Fig. 8B discloses a plurality of voltage waveforms utilized in the explanation of the novel single pulse generator of Fig. 8;

Fig. 8C is a potentiometer switch utilized in conjunction with the single pulse generator of Fig. 8;

Fig. 8D is a block diagram representation of the single pulse generator of Fig. 8 utilized in conjunction with the potentiometer switch of Fig. 8C;

Fig. 9 is a portion of composite Fig. 7 and together with Fig. 10 constitutes the visual indicator employed in the novel checking circuit apparatus herein disclosed and claimed; and Fig. 10 is a portion of composite Fig. 7 and together with Fig. 9 constitutes the visual indicator apparatus.

*Circuits frequently employed*

Referring more particularly to Fig. 1A, a schematic circuit diagram of a diode And circuit is illustrated. The diode And circuit comprises the input terminals designated as a 10 followed by a letter, the diodes 11–13 inclusive, the pull-up resistor 14, and the output terminal 16. The input terminals 10A, 10B and 10C are connected respectively to the cathodes of the diodes 11, 12, 13, and the anodes of these diodes are connected together at a juncture 15. It is seen that any desired number of diodes can be used and that this number is equal to the number of input terminals desired. The pull-up resistor 14 is connected between the positive voltage terminal B+ and the juncture 15. If one or more of the input terminals are Down, or at say —30 volts, the juncture 15 and the output terminal 16 are Down. When all of the input terminals 10A–10C are Up simultaneously, the juncture 15 and the output terminal 16 are Up. Fig. 1B is a block diagram representation which will be used hereinafter to represent the diode And circuit of Fig. 1A. The direction of the arrowheads in Fig. 1B indicates the direction of progress of a given signal pulse.

Fig. 1C represents an improved type And circuit which comprises the input terminal 19, the diodes 20–22 inclusive, the pull-up resistor 24, and the cathode follower tube 26. The input terminals 19A–19C are connected respectively to the cathodes of the diodes 20–22. The anodes of these diodes are connected together and to the juncture 23 which is connected through the parasitic suppressing resistor *ps* to the grid of the tube 26. The anode of tube 26 is connected through the decoupling resistor to the negative high voltage terminal B—, and to ground through capacitor 28. The resistor 27 and the capacitor 28 serve conjointly as a decoupling circuit between the high voltage supply and the anode of the cathode follower. The cathode of the cathode follower is connected through the resistors 29 and 30 to the terminal B—. The resistors 29 and 30 serve as a voltage dividing network which places the output terminal 31 at the proper potential. If all of the input terminals are Up simultaneously, the juncture 23 and the grid of the cathode follower 26 are Up so as to cause the output terminal 31 to be Up. The cathode follower tube 26 of Fig. 1C is used whenever it is desired to provide isolation between the input terminals and the output terminal 31, or whenever the current requirements of a load connected to terminal 31 are such that they should be supplied by a cathode follower. A block diagram of the circuit of Fig. 1C is shown in Fig. 1D where the input terminals are designated 19A–C and the output terminal is designated 31. The letters CF shown in Fig. 1D indicate the presence of a cathode follower. When one or more of the input terminals 19 are Down or at approximately —30 volts, the output terminal 31 is Down. It should be understood that the diode And circuit of Fig. 1A and the And circuit of Fig. 1C are functionally similar in operation and can be used interchangeably unless a circuit requirement indicates necessity of the cathode follower tube 26 of Fig. 1C.

The And circuit of Figs. 1CA and 1DA: The And circuits of Figs. 1CA and 1C are very similar with the exception that the And circuit of Fig. 1CA omits resistor 30 and its connection to a negative potential B—. Even with this difference the And circuit of Fig. 1CA were utilized, functions in essentially the same manner as that of the And circuit shown in Fig. 1C. The And circuit of Fig. 1CA is usually used as one member of a pair (wherein output terminals 31 of each member are connected in common) of And circuits wherein the other member is an And circuit of the type shown in Fig. 1C.

The And circuit of Fig. 1CA is represented by the block shown in Fig. 1DA.

Referring to Fig. 1E, the diode Or circuit comprises the input terminals 34, the diodes 35–37 inclusive, and the pull-down resistor 38. A plurality of input terminals are connected respectively to the anodes of the diodes 35–37 and the cathodes of these diodes are connected together at juncture 39. It should be understood that more or less than the number of diodes shown can be used according to the number of input terminals desired. The pull-down resistor is connected between terminal B— and juncture 39. When one or more of the input terminals 34A–C are Up or at approximately +5 volts, the juncture 39 and the output terminal 40 are Up, or at approximately +5 volts. However, if all of the input terminals 34 are Down or at approximately —30 volts, the juncture 39 and the output terminal 40 are Down or at —30 volts. A block diagram of the diode Or circuit of Fig. 1E is shown in Fig. 1F.

The schematic diagram of another Or circuit is illustrated in Fig. 1G and comprises a plurality of input terminals 43, the diodes 45—47 inclusive, the pull-down resistor 49, and the cathode follower tube 51. The cathodes of the diodes 45—47 are connected together and to juncture 48 connected through the parasitic suppressing resistor *ps* to the grid of the tube 51. The cathode of this tube is connected through the voltage dividing resistors 52 and 53 to the terminal B—. The output 54 of the Or circuit is taken from the juncture of resistors 52 and 53. The anode of tube 51 is connected through the decoupling components 55 to the terminal B+. When one or more of the input terminals 43A–C are Up or at approximately +5 volts, the juncture 48 and consequently the grid of the tube 51 are Up and the output terminal 54 is Up or at approximately +5 volts. Conversely, if all the input terminals 43 are Down, the output terminal 54 is Down. It is understood that the operation of the diode Or circuit of Fig. 1E and the Or circuit of Fig. 1G are functionally similar and these circuits may be interchanged unless circuit requirements indicate that the cathode follower tube 51 of Fig. 1G is necessary. The block diagram of the Or circuit of Fig. 1G is shown in Fig. 1H. The initials CF in Fig. 1H indicate the presence of a cathode follower, and thereby distinguish Fig. 1H from Fig. 1F.

Referring to the cathode follower circuit of Fig. 1I, the input terminals 58 is connected through the parasitic suppressing resistor *ps* to the control grid of tube 60. The cathode of the cathode follower tube 60 is connected through the voltage dividing resistors 61 and 62 to the terminal B—. The output terminal 63 is connected to the juncture between the resistors 61 and 62. The anode of the cathode follower 60 is connected through the decoupling circuit 64 to the terminal B+. If the input terminal 58 is Up or at approximately +5 volts the output terminal 63 is Up or at approximately +5 volts. Conversely, if the input terminal 58 is Down or at approximately —30 volts the output terminal 63 is Down or at approximately —30 volts. Hence, the cathode follower circuit is a non-inverting circuit operable to produce a positive voltage at its output terminal when the input terminal has a positive voltage applied thereto. The cathode follower circuit of Fig. 1I is normally used for isolation purposes or as a current driving unit where a particular signal source cannot supply the necessary current. Fig. 1J is a block diagram of the cathode follower circuit of Fig. 1I.

Fig. 1K shows a modification of the cathode follower circuit of Fig. 1I wherein the resistor 61 and the decoupling circuit 64 of Fig. 1I have been removed. The operation of the cathode follower of Fig. 1K is similar to that described for Fig. 1I. The block diagram used to represent the circuit of Fig. 1K is shown in Fig. 1L. The initials CF–1 shown in Fig. 1L are used to distinguish the circuits from Fig. 1J in which the initials CF are used.

The Cathode Follower Circuit of Figs. 1KA and 1LA: The cathode follower circuits of Figs. 1KA and 1K are very similar with the exception that the cathode follower circuit of Fig. 1KA omits resistor 62 and its connection to a negative potential B—. Even with this difference, the cathode follower circuit of Fig. 1KA where utilized, functions in essentially the same manner as that of the cathode follower circuit shown in Fig. 1K. The cathode follower circuit of Fig. 1KA is usually used as one member of a pair (wherein output terminals 63 of each member are connected in common) of cathode follower circuits wherein the other member is a cathode follower circuit of the type shown in Fig. 1K.

It will be appreciated that in certain instances it may be desirable to employ a cathode follower circuit of the type shown in Fig. 1K or Fig. 1KA with an additional resistor in the plate circuit of tube 60.

The cathode follower circuit of Fig. 1KA is represented by the block shown in Fig. 1LA.

Fig. 1M illustrates an inverting circuit which produces a negative voltage pulse at its output terminal when a positive voltage pulse is applied to the input terminal thereof. The input terminal 67 is connected through the parasitic suppressing resistor *ps* to the grid of the tube 69L. If the input terminal 67 is Up the grid of tube 69L is Up, thereby rendering this tube fully conductive. The anode of tube 69L is connected through the anode load resistor 70 and the decoupling circuit 71 to the terminal B+. The voltage dividing resistors 72 and 73 are connected between the anode of tube 69L and the terminal B− and direct couple the grid of tube 69R to the anode of tube 69L. A frequency compensating coupling capacitor 75 is connected in parallel with resistor 72. If the tube 69L is fully conductive, its anode is Down and the grid of tube 69R is Down. This causes the tube 69R to become less conductive. Since tube 69R is operating as a cathode follower, the output terminal 76 connected to its cathode is Down. Whenever the input terminal 67 is Down, the inverting tube 69L is cut off causing its anode to be at the B+ potential. The action of the voltage dividing resistors 72 and 73 cause the grid of the cathode follower tube 69R to be Up so that the output terminal 76 is Up. Fig. 1N is a block diagram of the circuit of Fig. 1M.

Amplifier switch: Fig. 1P is a circuit diagram of an amplifier switch. Referring to Fig. 1P, it will be seen that the triode T has its cathode connected to ground through resistor $R_1$, its plate connected to terminal S20, and its grid connected through resistor $R_2$ to terminal C10.

For purpose of explanation, let it be assumed that a relay is serially connected between terminal S20 and a potential of +150 volts. Then it will be apparent that when a potential of sufficient positive polarity with respect to ground is impressed on terminal C10 that the relay will be energized and transfer it contacts (not shown). Conversely, when the potential impressed on terminal C10 is negative with respect to ground, the relay will not be energized. In brief, the amplifier switch may be considered as merely a switch tube having a relay in its plate circuit.

Throughout the remaining figures of the drawing where an amplifier switch of the type shown in Fig. 1P is utilized, it will be represented by the block shown in Fig. 1Q.

Referring to Fig. 1R; the delay circuit is shown and claimed in U. S. Reissue Patent 23,699 issued August 18, 1953. The curves of Fig. 1S demonstrate the operation of the circuit shown in Fig. 1R. In order to facilitate the description, the time axis (abscissa) is divided into equal time intervals designated T1, T2, T3, T4, and T5 respectively. The length of each of these time intervals is dependent upon the particular circuit design. As an example, each time interval may be approximately one microsecond duration.

Briefly, an input pulse (Fig. 1S) is applied to the input terminal 154 of the circuit shown in Fig. 1R during one preselected time interval and produces an output pulse (Fig. 1S) at the output terminal 156 during the next subsequent time interval. An input pulse may be applied to the input terminal 154 during the same time interval (T3, for example) that an output pulse is produced at the output terminal 156. The flyback produced by an input pulse is used to set up the output pulse and the circuitry is such that there is complete isolation between the output and input pulses during any given time interval.

A clamping pulse (Fig. 1S) is applied to the terminal 162 to wipe out or remove the information stored after that information has been utilized.

A dual type tube having two triodes sections is employed. For convenience, the left-hand tube section is referred to as the tube L and the right-hand tube section is referred to as the tube R. The anode of tube L is connected through inductance 164 and an anode resistor 165 in parallel to a −150 volt terminal 166. The industance 164 is provided to increase the voltage swing in a positive direction at the anode of the tube L (Fig. 1S during T3 and T4) for a preselected time immediately after that tube is rendered non-conductive.

The diode rectifiers 167 and 168 connected respectively to the input terminal 154 and terminal 169, and the resistor connected between the juncture 171 of the diodes 167 and 168 and the +150 volt terminal 166 comprise a diode And circuit generally designated as **170*a*. The juncture 171** is connected through a parasitic suppressing resistor *ps* to the control grid of the tube L.

The tube R is operated as a cathode follower and is always conductive when a pulse is present at the output of the delay circuit. The cathode load resistor 173 is connected to a −82 volt terminal 174 which is also connected through a resistor 175 and capacitor 176 to the anode of the tube L. The terminal 162 is connected through resistor 177 and diode rectifiers 178, 179, and 180, in series, to the −30 volt terminal 181. The juncture 182 is connected between the rectifiers 179 and 180 and between the resistor 175 and the capacitor 176. The juncture 183 joining the rectifiers 178 and 179 is connected through a parasitic suppressor resistor 184 to the control grid of the tube R and through a capacitor 185 to ground.

During the time interval T1, in accordance with Fig. 1S, an input pulse is not applied to the input terminal 154 and juncture 171 is therefore Down so that a positive voltage is not applied to the control grid of the tube L. During this time interval tube L is non-conductive, tube R is conductive, but the output terminal 156 connected to the cathode thereof is Down. The voltage at the anode of tube L is +150 volts and the capacitor 176 is charged with 180 volts appearing across it (the left plate is at +150 volts and the right plate is at −30 volts). The juncture 182 cannot be appreciably more negative than the −30 volt terminal 181 without causing the rectifier 180 to conduct and return the voltage at juncture 182 to essentially that of the terminal 181. It is the conduction of rectifier 180 during the time interval T1 that keeps juncture 182 at approximately −30 volts. The resistor 175 tends to prevent the voltage at juncture 182 from drifting between the application of successive clamping pulses.

The juncture 183 is also at −30 volts, so that capacitor 185 is charged with −30 volts on its upper plate while the lower plate is at 0 volt (ground). Rectifier 179 conducts when capacitor 185 is being charged by the clamping pulse (Fig. 1S) applied to the terminal 162 which attempts to pull the juncture 183 below the −30 volts of terminal 181. Hence, when the clamping pulse is most negative, the voltage at the control grid of the tube R is pulled Down. Since tube R is a cathode follower, the voltage at the output terminal 156 is also pulled Down.

This action effects the wiping out of the information stored after that information has been used. In other words, the output pulse produced is brought to an end as shown at the beginning of the time intervals T4 and T5 (Fig. 1S). When the clamping pulse thus goes negative, the rectifier 178 is rendered conductive.

During the latter portion of the time interval T2 the input pulse and synchronous pulse are both positive simultaneously. The juncture 171 is therefore Up causing the tube L to become heavily conductive so that the voltage at its anode decreases rapidly (Fig. 1S). The capacitor 176 discharges through the tube L. The resulting tendency of juncture 182 to acquire the same voltage as the anode of the tube L is arrested by the conduction of rectifier 180 and the voltage at this juncture thus remains —30 volts.

Just at the start of time interval T3 both the input pulse and synchronous pulse go negative and the voltage at the juncture 171 and control grid of tube L accordingly go Down causing tube L to be rendered non-conductive. As a result, the voltage at the anode of tube L increases rapidly and actually exceeds +150 volts, because this anode circuit is less than critically damped during the flyback time. It is this increased voltage or flyback which initiates the output pulse. This voltage is transferred through capacitor 176 to cause the voltage at juncture 182 to go Up from —30 volts to approximately +5 volts. The rectifier 179 then conducts to cause the juncture 183 and the control grid of tube R to go Up and the upper plate of capacitor 185 is charged positive relative to its lower or grounded plate. The voltage at the output terminal 156 connected to the cathode of the tube R follows the control grid thereof and goes Up to initiate the output pulse during the time interval T3.

As the voltage at the anode of tube L decreases to +150 volts, the voltage at juncture 182 similarly decreases. During the latter portion of time interval T3 the voltage at the juncture 182 is again approximately —30 volts. Both of the terminals 154 and 169 again go positive as shown by the input and synchronous pulses, respectively, occurring during the latter part of time interval T3 while the output terminal 156 is still Up.

As a result the tube L again becomes heavily conductive and the voltage at its anode decreases, but the juncture 182 again remains at —30 volts because of the conduction through rectifier 180.

When the clamping pulse goes negative at the start of time interval T4, conduction through rectifiers 178, 179, and 180 results and juncture 183, as well as juncture 182, is placed at approximately —30 volts. The control grid of tube R and output terminal 156 therefore go Down and the output pulse (occurring during the time interval T3 and produced in response to the input pulse applied during the time interval T2) is terminated.

When the juncture 171 goes Down at the start of time interval T4, the tube L becomes non-conductive and its anode voltage starts to increase rapidly as described hereinbefore.

This increased voltage causes the juncture 182 to go Up, the juncture 183 to go Up, and the output terminal 156 to go Up as indicated by the output pulse occurring during time interval T4. The voltage at the anode of tube L finally settles during the time interval of T5 at a steady value of +150 volts in accordance with the dampening effect. If an input pulse were applied during the time interval T4, the voltage at the anode of tube L would never reach a steady value of +150 volts. Such is indicated by this anode voltage during the time interval T3.

Just prior to the anode of tube L reaching a steady voltage value, the clamping pulse goes negative (time interval T5). At this time the juncture 182 has again assumed a voltage value of —30 volts, but the juncture 183 is still Up. When the clamping pulse causes the terminal 162 to go negative, the rectifiers 178, 179, and 180 are rendered conductive, and the voltage at the juncture 183 goes Down to terminate the output pulse at the beginning of time interval T5.

Hence, the use of flyback makes possible the production of an output pulse in one preselected time interval in response to an input pulse received during the next prior time interval. Also, the rectifier circuitry and a clamping pulse are employed to effect complete isolation between input and output circuits simultaneously operable.

The block diagram of the circuit of Fig. 1R is shown in Fig. 1T.

Or-Inverter circuit (cathode follower type): Referring to Fig. 1U, an Or-Inverter of the cathode follower type is disclosed. This Or-Inverter may be considered as the combining of an Or circuit of the type shown in Fig. 1E and an inverter circuit of the type shown in Fig. 1M. Input terminals 34A, 34B, and 34C of the Or circuit of Fig. 1E correspond respectively to input terminals 77A, 77B, and 77C of the Or-Inverter circuit of Fig. 1U. Further, output terminal 40 of the Or circuit of Fig. 1E is directly connected to the input terminal 67 of the inverter circuit of Fig. 1M and the output terminal 78 of the Or-Inverter circuit of Fig. 1U corresponds to output terminal 76 of the inverter circuit of Fig. 1M. Now from the prior discussion the operation of the Or circuit of Fig. 1E and the inverter circuit of Fig. 1M, it will be apparent that when all of the input terminals, namely, 77A, 77B, and 77C of the Or-Inverter circuit of Fig. 1U are each in the Down condition, that the output terminal 78 is Up. Also, when any one or more of the input terminals, namely, 77A, 77B and 77C are Up the output terminal 78 is Down. Briefly, the Or-Inverter circuit of Fig. 1U is exactly what its name would imply, the combination of an Or circuit and an inverter circuit.

Throughout the remaining figures of the drawing where an Or-Inverter circuit of the cathode follower type is utilized it will be represented by the block diagram shown in Fig. 1V.

The Modulo 2 latch: Referring to Fig. 6 of the drawing, a Modulo 2 latch is shown within the enclosed broken line labelled "Modulo 2 Latch for the 1 Bit of the First Digit Position DL1–1." The Modulo 2 latch includes: an Or circuit 5251 whose detailed circuit diagram is shown in Fig. 1G; an And circuit 5252 whose detailed circuit diagram is shown in Fig. 1CA; an Or-Inverter circuit 5253 whose detailed circuit diagram is shown in Fig. 1U; a delay circuit 5254 whose detailed circuit diagram is shown in Fig. 1R; an amplifier switch 5255 whose detailed circuit diagram is shown in Fig. 1P; a relay 5256 having a normally open contact 5257; and an indicator lamp 5258 controlled by contact 5257.

Now still referring to the Modulo 2 latch of Fig. 6, the following connections will be observed: output terminal 54 of Or circuit 5251 is connected in common to input terminal 19C of And circuit 5252 and to input terminal 77B of Or circuit 5253; output terminal 31 of And circuit 5252 is connected in common with output terminal 78 of Or-Inverter circuit 5253 to input terminal 154 of relay circuit 5254; output terminal 156 of delay circuit 5254 is connected in common to input terminal C10 of amplifier switch 5255, to input terminal 77A of Or-Inverter circuit 5253, and to input terminal 19A of And circuit 5252; relay 5256 is connected between terminal S20 of amplifier switch 5255 and a source of positive potential (150 volts); and relay contacts 5257, lamp 5258 and source of direct current potential constitute a series circuit under control of relay 5256.

The Modulo 2 latch is essentially an even-odd device, that is, in response to a first input it assumes a first position, in response to a second input it assumes a second position, in response to a third input it assumes said first position, in response to a fourth input it assumes said second position, etc. In the novel checking circuit herein disclosed and claimed, sixty-six Modulo 2 latches are utilized. Each of these sixty-six Modulo 2 latches is identical and functions in the same manner. Now as pointed out earlier, the Modulo 2 latch for the "1" bit, i. e., data line DL1–1 is shown in detail in Fig. 5. Now it will be noted that input terminal 19B of And circuit 5252 (and all of the corresponding input terminals 19B of And circuits 5252 of the remaining sixty-five latches) are connected in common and through cathode follower 6182 to Modulo 2 clear terminal 661.62. All that is to be appreciated at this point is that if terminal 661.62 is Up, then each of the input terminals 19B of And circuits 5252 for all sixty-six of the Modulo 2 latches will also be Up and conversely if said terminal is Down. Now still referring to Fig. 6, it is to be recognized that each of the input terminals 43B of Or circuit 5251 of all sixty-six of the Modulo 2 latches are connected in common and through cathode follower 6181 to Modulo 2 accept gate terminal 661.18 Thus it will be apparent that when terminal 661.18 is in the Up condition, each of the 43B input terminals of Or circuits 5251 of all sixty-six of the Modulo 2 latches will be in the Up condition. Conversely, if terminal 661.18 is in the Down condition.

Now it will be seen from Fig. 6 that input terminal 43A of Or circuit 5251 of the Modulo 2 latch for the "1" bit of the first digit position is connected to data line DL1–1. In ordered sequence each of the remaining sixty-five Modulo 2 latches will have their respective terminals 43A of Or circuits 5251 connected to a single data line.

By way of illustration: the Modulo 2 latch for the "2" bit of the first digit position is connected to data line DL1–2; the Modulo 2 latch for the "4" bit of the first digit position is connected to data line DL1–4; the Modulo 2 latch for the "8" bit of the first digit position is connected to data line DL1–8; the Modulo 2 latch for the "1" bit of the second digit position will be connected to data line DL2–1; the Modulo 2 latch for the "2" bit of the second digit position will be connected to data line DL2–2; and corresponding connections will be made throughout the remaining digit positions, terminating with the sixty-sixth Modulo 2 latch. That is, the sixty-sixth Modulo 2 latch or the Modulo 2 latch for the "2" bit of the seventeenth digit position will be connected to data line DL17–2.

It will now be appreciated that any control effected through the application of a positive or negative potential respectively on the Modulo 2 clear terminal 661.62 and on the Modulo 2 accept gate terminal 661.18 is commonly applied to each of the sixty-six Modulo 2 latches. Now since each of the latches functions in identically the same manner it will suffice to describe in detail how a single Modulo 2 latch accomplishes its function.

For purposes of explanation, assume that the Modulo 2 latch (responsive to data line DL1–1) under discussion is de-energized (i. e., its lamp is Off), that the Modulo 2 accept gate terminal 661.18 is Down and the Modulo 2 clear terminal 661.62 is Up. Thus, the output of cathode follower 6181 and input terminal 43B of Or circuit 5251 will each be Down, whereas the output of cathode follower 6182 and input terminal 19B of And circuit 5252 will each be Up. Now assume at this instant that a binary "0" is manifested on data line DL1–1; that is, data line DL1–1 is in the Down condition. Under these conditions input terminals 43A and 43B of Or circuit 5251 are respectively in the Down condition and consequently output terminal 54 of Or circuit 5251, input terminal 19C of And circuit 5252 and input terminal 77B of Or-inverter circuit 5252 are each in the Down condition. Since the Modulo 2 latch under discussion was assumed to be de-energized the output of delay circuit 5254 will be in the Down condition. Consequently input terminal 77A of Or-Inverter circuit 5253 and input terminal 19A of And circuit 5252 will each be in the Down condition. Now with both of the input terminals, that is, 77A and 77B of Or-Inverter circuit 5253 simultaneously in the Down condition, output terminal 78 of said Or-Inverter circuit will be in the Up condition. Now with output terminal 78 in the Up condition, input terminal 154 of delay circuit 5254 will be in the Up condition and approximately one microsecond later the output terminal 156 of delay circuit 5254 will be in the Up condition. When output terminal 156 of delay circuit 5254 is in the Up condition, input terminal C10 of amplifier switch 5255 will be in the Up condition. Amplifier switch 5255 will be energized, resulting in the energization of relay 5256 and the closing of contact 5257. With contact 5257 closed, lamp 5258 will be On and will remain On as long as the output terminal 156 of delay circuit 5254 is in the Up condition. It will now be seen that when terminal 156 is Up (through the medium of feedback lead $FB_1$), input terminal 77A of Or-Inverter circuit 5253 and input terminal 19A of And circuit 5252 are each in the Up condition. Now assume that during the one microsecond delay of delay circuit 5254, the Modulo 2 accept gate terminal 661.18 switched from the Down to the Up condition, and the Modulo 2 clear terminal 661.62 remained in the Up condition. Now without regard to the condition (i. e., Up or Down) of data line DL1–1, since input terminal 43B of Or circuit 5251 is Up, output terminal 54 of said Or circuit and input terminal 19C of And circuit 5252 will be Up, as will input terminals 19A and 19B of And circuit 5252 (due respectively to the output of delay circuit 5254, and terminal 661.62 being in the Up condition). Thus with all three of the inputs of And circuit 5252 simultaneously in the Up condition, the input to delay circuit 5254 will be in the Up condition as will be the output of said delay circuit. As will be recalled when the output of delay circuit 5254 is Up, lamp 5258 will be On and input terminal 19A of And circuit 5252 will be Up. Thus it will be seen that if each of the other inputs of And circuit 5252 are still simultaneously in the Up condition, lamp 5258 will remain On as long as the latch is energized.

With the Modulo 2 latch, under discussion with respect to this explanation, energized, lamp 5258 of said latch will be On. It will now be apparent that if Modulo 2 clear terminal 661.62 were switched from the Up condition to the Down condition, the Modulo 2 latch under discussion would be de-energized. This would result from the fact that input terminal 19B of And circuit 5252 would be in the Down condition causing the output of said And circuit, the input of delay circuit 5254 and the output of said delay circuit to each to be in the Down condition. As was pointed out earlier, when the output of delay circuit 5254 is Down, amplifier switch 5255 is de-energized as is relay 5256. Thus it is seen how impressing a negative potential of sufficient magnitude on the Modulo 2 clear terminal for a short time interval clears, i. e., de-energizes, the Modulo 2 latch under discussion. It is to be appreciated that the clearing (i. e., resetting) of the remaining sixty-five Modulo 2 latches would inherently be accomplished when the single latch under discussion was cleared, i. e., reset.

From the above discussion, it will be apparent that no matter what the individual status of the sixty-six Modulo 2 latches is, by impressing a Modulo 2 clear pulse, i. e., impressing a negative potential of sufficient magnitude on Modulo 2 clear terminal 661.62, each of the Modulo 2 latches will assume the de-energized condition. In other words, all sixty-six lamps will be Off.

Now to carry the earlier discussion a step further, let the following conditions be assumed for the single Modulo 2 latch shown within the broken line of Fig. 6 of the drawing: the Modulo 2 latch is energized, i. e., the output terminal of delay circuit 5254 is in the Up condition, and lamp 5258 is On. The Modulo 2 clear terminal 661.62 is in the Up condition, and the Modulo 2 accept gate terminal 661.18 is in the Up condition. (As was pointed out earlier, when terminals 661.18 and 661.62 are each in the Up condition, the condition of the data line—in this instance DL1–1—i. e., Up or Down condition, has no effect on the Modulo 2 latch.)

Now assume that information in binary notation is impressed upon the data lines and that the Modulo 2 latches are to reflect the acceptance of this information by the sixty-six Modulo 2 latches. In order to accomplish this, at the particular time interval when the data is manifested on the data lines by an array of Up and Down conditions, i. e., binary 1's and binary 0's, the Modulo 2 accept gate terminal must be Down. This can be accomplished by impressing a negative voltage pulse of sufficient amplitude and duration on the Modulo 2 accept gate terminal 661.18 at the proper time, namely, the time interval at which the information that is to be reflected by the condition of the various Modulo 2 latches is present on the data lines. Now assume that during the interval that the Modulo 2 accept gate is Down, data line DL1-1 is Up reflecting the presence of a binary "1" and the Modulo 2 latch associated with said data line is de-energized. The binary "1" will result in input terminal 43A of Or circuit 5251 being in the Up condition and output terminal 54 of Or circuit 5251 being in the Up condition. Now when terminal 54 is in the Up condition, input terminal 77B of Or-Inverter circuit 5253 is in the Up condition, resulting in output terminal 78 of said Or-Inverter circuit being in the Down condition. When terminal 78 is in the Down condition the input and output of delay circuit 5254 will be in the Down condition thus precluding the energization of amplifier switch 5255 and the turning On of lamp 5258.

From the above discussion it is seen that the Modulo 2 latch when normally operated does not respond to the presence of a binary "1" but is only responsive to the presence of a binary "0." The preceding statement will appear even more clearly as the discussion is carried forth. Now again assume that the Modulo 2 latch under discussion is de-energized, that Modulo 2 clear terminal 661.62 is in the Up condition and that Modulo 2 accept gate is Down during a time interval when information in binary or binary-decimal or other coded form is manifested by the Up and Down condition of the various data lines. In particular, assume that a binary "0" is reflected by the Down condition of data line DL1-1. Now as was pointed out earlier herein, this will result in both of the inputs of Or circuit 5251 being Down and the Modulo 2 latch being energized. Since the Modulo 2 accept gate terminal 661.18 will return to the Up condition immediately after the interval during which it was Down in order to accomplish the reading in of information to the Modulo 2 latches, the Modulo 2 latch under discussion will remain energized at least until a subsequent time interval during which information is read into the Modulo 2 latches.

Now assume that during a subsequent time interval during which information appears on the data lines, it is desired that this information be also read into, or reflected by, the various (Up-Down) conditions of the sixty-six Modulo 2 latches. Then during this time interval it will be necessary for the accept gate to be in the Down condition, and if both the accept gate and data line DL1-1 are in the Down condition, the output of Or circuit 5251 will be in the Down condition. This will result in the input terminal 19C of And circuit 5252 being in the Down condition. Now when the Modulo 2 latch is latched, i. e., the output of delay circuit 5254 is in the Up condition and input terminal 19C of And circuit 5252 assumes a Down condition, then the three inputs to said And circuit will no longer all be in the Up condition and hence the output of said And circuit will assume the Down condition. When the output of And circuit 5252 assumes the Down condition, the input and output of delay circuit 5254 will respectively be in the Down condition. This will result in lamp 5258 being turned Off. Hence it is apparent that when the Modulo 2 latch is subjected to a first entry of binary "0" and a second entry of binary "0," the latch will be in the de-energized condition if it was in this condition initially. Thus, if a third binary "0" was accepted by the Modulo 2 latch the lamp would be turned On whereas subjecting said Modulo 2 latch to a fourth binary "0" would in turn, turn said lamp Off. Thus, in conclusion, it will be apparent that: (1) each of the Modulo 2 latches functioning in the manner described above respond only to binary 0's manifested by their respective data lines and this only under the control of the Modulo 2 accept gate; and (2) if the Modulo 2 latches are all initially in the de-energized state, i. e., their respective lamps Off, they will respectively be in a condition reflecting the relative number of binary 0's that they individually have been subjected to. For example, consider the Modulo 2 latch associated with data line DL1-1. If this latch is initially subjected to a binary "0" when in the de-energized condition, it will assume the energized condition. The next binary "0" to which said Modulo 2 latch is subjected will result in it assuming the de-energized condition. The condition of the Modulo 2 latch will follow this pattern no matter how many binary 0's the latch is subjected to, that is, the latch is an even-odd device wherein it is energized when in an odd condition and de-energized when in an even condition.

It is well to appreciate now, that if a Modulo 2 latch is subjected to "$n$" binary 0's it may be in the energized or de-energized condition depending on whether "$n$" is even or odd. However the subjection of a Modulo 2 latch to "$2n$" binary 0's will always result in said latch assuming its initial condition which herein is the de-energized condition.

In the novel checking circuit herein disclosed and claimed, sixty-six Modulo 2 latches are utilized, one Modulo 2 latch for each data line. From the preceding discussion it will now be obvious that if the data lines had successively impressed upon them a plurality of words expressed in binary or binary-decimal notation (or other suitable notation) and the Modulo 2 latches were gated to reflect the acceptance of said plurality of words impressed on the data lines, that the sixty-six Modulo 2 lamps, one associated with each Modulo 2 latch, would assume a pattern of On-Off which would reflect which Modulo 2 latches had accepted an even number of binary 0's (i. e., Off) and which had accepted an odd number of binary 0's (i. e. On).

Now assume that the same plurality of words is again impressed on the data lines and the sixty-six Modulo 2 latches are again gated to accept these words. Now if the plurality of words that first appeared on the data lines and were accepted by the Modulo 2 latches were accurately reproduced when impressed on the data lines for the second time and again accepted by the sixty-six Modulo 2 latches, then all of the Modulo 2 lamps will be in the Off condition.

Two Position Switch: The circuit of the two position switch is disclosed in Fig. 1W. The two position switch includes two And circuits each of the type shown in Fig. 1A and an Or circuit of the cathode follower type shown in Fig. 1G. The two position switch can be used in a variety of arrangements but in the circuit diagram of the novel checking circuit disclosed herein, the two position switch finds particular application as one component of a latch circuit. The latch circuit per se will be explained and dislosed hereinafter.

Now still referring to Fig. 1W, it will be seen that input terminals 300A and 301A of the two position switch are respectively connected to input terminals 10A and 10B of And circuit 307 of the two position switch and that output terminal 16 of And circuit 307 is connected to input terminal 43A of Or circuit 309 of the two position switch. In like manner, input terminals 302A and 303A of the two position switch are respectively connected to input terminals 10A and 10B of And circuit 308 of the two position switch and output terminal 16 of And circuit 308 is connected to input terminal 43B of Or circuit 309 of the two position switch. The output terminal 54 of Or circuit 309 is connected to the output terminal 306A of the two position switch.

It will now be appreciated that if input terminals 300A and 301A of the two position switch of Fig. 1W are simultaneously in the Up condition, then the output terminal 16 of And circuit 307 will be in the Up condition causing input terminal 43A of Or circuit 309 to be in the Up condition. When input terminal 43A of Or circuit 309 is in the Up condition then output terminal 54 of said Or circuit is in the Up condition as is output terminal 306A of the two position switch. Similarly it will be apparent that when input terminals 302A and 303A of the two position switch are simultaneously in the Up condition, that the output terminal 306A of the two position switch will be in the Up condition. It will be appreciated that if only either one of input terminals 300A and 301A and only either one of input terminals 302A and 303A are simultaneously in the Up condition, the output terminal 306A of the two position switch will be in the Down condition. That is, of the four input terminals of the two-position switch a selected two as contrasted with any two must be in the Up condition in order for the output terminal of the two position switch to be in the Up condition. It will now be apparent that input terminals 300A and 302A of a two position switch can be utilized as information inputs and input terminals 301A and 303A of a two position switch as control inputs. For example, if a control (Up) pulse is applied to terminal 301A, and this terminal is in the Up condition, when an information pulse (Up) is simultaneously applied to terminal 300A the result will be an output appearing at output terminal 306A. Correspondingly, if a control pulse is applied to input terminal 303A causing it to be in the Up condition and an information pulse is applied to input terminal 302A causing it to be in the Up condition then output terminal 306A will be in the Up condition.

Throughout the remaining figures of the drawing (with a single exception) where a two position switch of the type shown in Fig. 1W is utilized, it will be represented by the block diagram shown in Fig. 1X.

The latch circuit: Fig. 1Y discloses a latch circuit of the general type utilized in the novel checking circuit herein disclosed and claimed. The latch circuit of Fig. 1Y employs a two position switch 310 and a delay circuit 410. The input terminals 300A, 301A, 302A and 303A of the two position switch constitute the input terminals of the latch circuit and the output terminal 156 of delay circuit 410 constitutes the output terminal of the latch circuit. From Fig. 1Y it will be seen that output terminal 306A of two position switch 310 is directly connected to input terminal 154 of delay circuit 410 and that output terminal 156 of delay circuit 410 is connected via feedback lead FB to input terminal 303A of two position switch 310.

Now for purposes of explanation, let certain conditions be assumed to exist on input terminals 300A, 301A, 302A and 303A; that is, terminals 300A, 301A, and 303A are respectively in the Down condition and terminal 302A in the Up condition. Now assume that during a time interval T a control pulse is impressed on terminal 300A resulting in said terminal being in the Up condition. Now with terminals 300A and 302A respectively in the Up condition, and terminals 301A and 303A respectively in the Down condition, the two position switch 310 will remain unenergized. However, assume that at this time an information pulse is applied to input terminal 301A resulting in this terminal assuming the Up condition. Then with terminals 300A and 301A simultaneously in the Up condition, output terminal 306A of two position switch 310 will assume the Up condition (for the duration of the concurrence of terminals 300A and 301A being in the Up condition). The pulse appearing at output terminal 306A of the two position switch and at input terminal 154 of delay circuit 410, will result in a corresponding pulse appearing one microsecond later at output terminal 156 of delay circuit 410. The pulse appearing at the output terminal 156 of delay circuit 410 is conveyed via feedback lead FB to input terminal 303A of two position switch 310. This pulse will result in input terminal 303A being in the Up condition simultaneously with input terminal 302A and hence output terminal 306A of the two position switch will be Up. At this point it is seen that the cycle will repeat since the feedback lead remains unbroken and input terminal 302A remains in the Up condition. With the cycle repeating as explained above, the latch circuit will be referred to as being latched or energized. It must be appreciated that although all of the latch circuits utilized in the novel checking circuit are not exactly of the type shown in Fig. 1Y; yet generally, they all function in a manner similar to that of the latch shown in Fig. 1Y.

It will now be appreciated that when the latch circuit of Fig. 1Y is energized, latched or in the Up condition, output terminal 156 of the latch circuit will be in the Up condition. Correspondingly, it will be appreciated that with the latch circuit of Fig. 1Y in the de-energized, unlatched or Down condition, output terminal 156 of the latch circuit will be in the Down condition. Further, it will be noted that in order to latch the latch circuit of Fig. 1Y input terminals 302A and 303A of the two position switch 310 must be simultaneously in the Up condition. This may be accomplished by initially placing positive potentials of sufficient magnitude simultaneously on input terminals 300A and 301A of the two position switch 310.

Single pulse generator: Before discussing the novel single pulse generator of Fig. 8, it is well to consider the simple circuit of Fig. 8E capable of sometimes producing a single pulse of one microsecond duration. The circuit of Fig. 8E consists of an input lead connected serially through a delay circuit and an inverter circuit to a first input terminal of an And circuit. The input lead is also connected directly to the second input of said And circuit. It will be appreciated by those skilled in the art, that if a one microsecond pulse is impressed on the input lead, an output pulse of one microsecond will be impressed on the output of said And circuit, i. e., the output lead. However, assume that the means for selecting a one microsecond pulse to be impressed on the input lead is a mechanical switch or relay. In the absence of an additional means for synchronizing the mechanical switch or relay, a marginal pulse may be impressed on the input lead, a marginal pulse being defined as a pulse lacking in either magnitude or duration, or both. A marginal pulse employed in the checking circuit hereinafter disclosed in detail (i. e., the circuitry that functions in response to the single pulse emitted by the single pulse generator) would result in the circuitry functioning erratically.

The single pulse generator of Figs. 8 through 8D eliminates the possibility of a marginal pulse occurring by employing the circuitry shown in Figs. 8 and 8C. Two conditions resulting in marginal pulses, but overcome by the pulse generator of Fig. 8 and the potentiometer switch of Fig. 8C, are: (1) Referring to Fig. 8E, the input pulse is not synchronized with the basic timing pulses in the calculator. This will result in the delay circuit emitting partial (marginal) pulses that are somewhere between the Up and Down condition and cause malfunctioning of the circuits which they feed. (2) Mechanical contacts such as switches and relays are prone to bounce, which in the above circuit, could result in multiple output pulses. Briefly, the single pulse generator accomplishes the selecting a single pulse from a synchronized source of pulses by unsynchronized means.

How the above two undesirable conditions are overcome by the circuitry of Figs. 8 and 8C will be apparent to those skilled in the art from the detailed discussion that follows.

Referring to Fig. 8, the logical circuit diagram of the single pulse generator is shown. The operation of the single pulse generator is such that a single output pulse of any desired duration, say one microsecond, may be developed whenever a sustained input pulse is applied and regardless of the duration of said input pulse. Two additional pulses are available in the output, but their duration is governed by the time interval of two control pulses. This will be explained in detail hereinafter with reference to Figs. 8 and 8B.

Now referring to Fig. 8, it will be seen that: input terminal 521 of the single pulse generator is connected to input terminal 19A of And circuit 523; and that input terminal 520 of the single pulse generator is connected to input terminal 19B of And circuit 523 and to input terminal 19A of And circuit 525. Further, it will be observed, that the output of And circuits 523 and 525 are commonly connected to the input of delay circuit 524. The output of delay circuit 524 is connected to input terminal 19B of And circuit 525, input terminal 19C of And circuit 526, and input terminal 10A of And circuit 534.

Now still referring to Fig. 8, it will be seen that input terminal 522 of the single pulse generator is connected to input terminal 19B of And circuit 526. The output of And circuit 526 is connected to the input of delay circuit 528. The output of delay circuit 528 is connected to output terminal 537 and to input terminal 34A of Or circuit 532. Also, it will be seen that: the output of And circuit 534 is connected to input terminal 34B of Or circuit 532; the output of Or circuit 532 is connected to the input of delay circuit 535: the output of delay circuit 535 is connected to input terminal 10B of And circuit 534, output terminal 533 of the single pulse generator and to the input of inverter 527; and the output of inverter 527 is connected to input terminal 19A of And circuit 526 and to output terminal 536 of the single pulse generator.

Now referring to Fig. 8B, a number of voltage waveforms are shown. Namely, three input voltage waveforms that are used in obtaining three useful output voltage waveforms. The ordinate of each waveform is calibrated in microseconds and a common scale is shown at the bottom of Fig. 8B. The ordinate of each voltage waveform is expressed in volts positive or negative. When any of the voltage waveforms shown in Fig. 8B is at the higher of its two voltage values it is at approximately +10 volts and is referred to as being in the Up condition. Correspondingly, when any of the voltage waveforms shown in Fig. 8B is at the lower of its two voltage values, namely, approximately −35 volts, it is referred to as being in the Down condition.

For purposes of explanation, let it be assumed that the voltage waveforms shown in Fig. 8B and labelled V520, V521 and V522 are respectively applied to input terminals 520, 521 and 522 of the single pulse generator. Then it will be apparent that terminal 520 and thus 19B of And circuit 523 and input terminal 19A of And circuit 525 will all be in the Up condition for the first sixteen microseconds (time interval $T_0$ through time interval $T_{15}$) of the arbitrarily chosen twenty microsecond period shown in Fig. 8B. Now it will be seen from voltage waveform 521, that input terminal 521 of the single pulse generator and input terminal 19A of And circuit 523 will both be in the Up condition during the first ($T_0$), ninth ($T_8$) and seventeenth ($T_{16}$) time intervals of the arbitrarily chosen twenty microsecond period of Fig. 8B. Further, it will be seen that input terminal 522 of the single pulse generator and input terminal 19B of And circuit 526 are both in the Up condition during the eighth microsecond ($T_7$) and the sixteenth microsecond ($T_{15}$) of the arbitrarily chosen twenty mircosecond period of Fig. 8B.

Now it will be apparent that with both input terminals 520 and 521 of the single pulse generator in the Up condition during the first mircosecond, namely $T_0$, that the output of delay circuit 524 will be in the Up condition during the second microsecond ($T_1$). When the output terminal of delay circuit 524 is in the Up condition then input terminal 19B of And circuit 525 will be in the Up condition. Thus during the second microsecond ($T_1$) both input terminals of And circuit 525 are in the Up condition and thus the output terminal of said And circuit will be in the Up condition and result in the input terminal to delay circuit 524 being in the Up condition. Now as a result of the input terminal of delay circuit 524 being in the Up condition during time interval $T_1$, the output of delay circuit 524 will be in the Up condition during the time interval $T_2$ as will input terminal 19B of And circuit 525. Since terminal 520 remains in the Up condition through time interval $T_{15}$, the output terminal of delay circuit 524 (that is, the output of latch 530) will remain in the Up condition through time interval $T_{16}$. Latch 530 is the circuitry enclosed within the broken line labelled 530 and it will be apparent that its characterizing feature is the feedback of the output of delay circuit 524 to the input terminal 19B of And circuit 525.

When latch 530 is energized the output terminal of delay circuit 524 is in the Up condition and this condition exists from the $T_1$ time interval through the $T_{16}$ time interval (sixteen microseconds). Now referring to Fig. 8, it will be seen that when latch 530 is energized, input terminal 19C of And circuit 526 and input terminal 10A of And circuit 534 are each in the Up condition. Input terminal 19A of And circuit 526 is in the Up condition when inverter 527 is not energized. At this point in the explanation, assume that inverter 527 is deenergized, i. e., input terminal 19A of And circuit 526 in the Up condition. From Fig. 8, it will be seen that during time intervals $T_7$ and $T_{15}$ respectively, input terminal 522 of the single pulse generator and input terminal 19B of And circuit 526 will each be in the Up condition. Thus at time interval $T_7$ all three inputs, namely, 19A, 19B and 19C of And circuit 526 are each in the Up condition resulting in the output of And circuit 526 and the input of delay circuit 528 being in the Up condition during this microsecond ($T_7$). Hence, during time interval $T_8$ the output of delay circuit 528 will be in the Up condition as will input terminal 34A of Or circuit 532. When either of the input terminals of Or circuit 532 is in the Up condition, then the input terminal of delay circuit 535 will be in the Up condition during the same time interval (i. e., $T_8$). Thus during time interval $T_9$, the output of delay circuit 535 will be in the Up condition. The input terminal 10B of And circuit 534 will also be in the Up condition during time interval $T_9$ as a result of the feedback connection between the output of delay circuit 535 and said input terminal. Since input terminal 10A of And circuit 534 is in the Up condition, i. e., latch 530 energized, the concurrence of input terminals 10A and 10B of And circuit 534 each being in the Up condition during time interval $T_9$ results in the output terminal of said And circuit and the input terminal 34B of Or circuit 532 being in the Up condition. Thus the output of Or circuit 532 and the input of delay circuit 535 will be in the Up condition during time interval $T_9$ and result in the output of delay circuit 535 being in the Up condition during time interval $T_{10}$. Now as was pointed out earlier, the output of delay circuit 535 is fed back to input terminal 10B of And circuit 534 and the foregoing cycle is repeated since latch 531, i. e., the circuitry enclosed within broken line 531, is energized. Latch 531 will remain energized until input terminal 10A of And circuit 534 returns to the Down condition. This will come about at the end of time interval $T_{16}$ since voltage waveform 520 is positive through time interval $T_{15}$. Thus the output of delay circuit 535 will switch from the Up condition to the Down condition at the end of time interval $T_{17}$.

It will be recalled that the voltage waveform impressed on terminal 522 resulted in said terminal being in the Up condition during time intervals $T_7$ and $T_{15}$. The Up condition of terminal 522 during time interval $T_7$ resulted in latch 531 being energized at the beginning of time interval $T_9$. When latch 531 is energized, that is, the output of delay circuit 535 is in the Up condition, then output terminal 533 is in the Up condition and output terminal 536 is in the Down condition as a result of inverter circuit 527. Now it will be seen that input terminal 19A of And circuit 526 is at all times in the same condition as output terminal 536 of the single pulse generator. Thus input terminal 19A of And circuit 526 is in the Down condition starting at the beginning of time interval $T_9$ and through time interval $T_{17}$. Therefore the fact that terminal 522 is in the Up condition during time interval $T_{15}$ does not result in a second output of a one microsecond pulse at output terminal 537. In like manner, the fact that input terminal 521 is in the Up condition during time interval $T_8$ has no effect since latch 530 is energized at this time. When input terminal 521 is in the Up condition during time interval $T_{16}$, it has no effect on the single pulse generator since input terminal 520 is in the Down condition at this time.

To briefly summarize: with input terminals 520, 521 and 522 respectively having impressed thereon the voltage waveforms V520, V521 and V522 shown in Fig. 8B, output terminals 537, 533 and 536 will respectively simultaneously have appearing thereon voltage waveforms V537, V533 and V536.

Referring to Fig. 8C, a potentiometer-switch arrangement is shown which is utilized in conjunction with the single pulse generator of Fig. 8. It will be seen that junctions 541 and 542 of said switch are respectively connected to input terminal 19B of And circuit 523 and input terminal 19A of And circuit 525 of the single pulse generator of Fig. 8. When switch 538 grounds terminal 538A then junctures 541 and 542 are each in the Down condition. Correspondingly, when switch 538 grounds terminal 538B then junctures 541 and 542 are each in the Up condition. The embodiment of the single pulse generator employing the switch of Fig. 8C is represented by the block shown in Fig. 8D. It will be seen that in this embodiment input terminals 521 and 522 of the single pulse generator are connected in common. Actually, the switch of Fig. 8C may be thought of as a manual or mechanical (potentiometer) switch, i. e., a relay operated transfer contact 538 cooperating with a potentiometer and all connected to input terminal 520 of the single pulse generator of Fig. 8. If the switch of Fig. 8C is considered in this manner, then the earlier explanation of the operation of the single pulse generator in conjunction with Fig. 8 is still valid with the limitation that terminal 538B be grounded from time interval $T_0$ through time interval $T_{15}$.

Assume that the single pulse generator is employed in the embodiment utilizing the potentiometer-switch of Fig. 8C. This embodiment is represented by the block of Fig. 8D. Further assume that initially terminal 538B is grounded. When terminal 538B is grounded, input terminal 19A of And circuit 525 and input terminal 19B of And circuit 523 are each in the Up condition. Now assume that two positive pulses (displaced in time) render commonly connected input terminals 521 and 522 of the single pulse generator Up for two (displaced in time) short time intervals. Then, as explained earlier, one microsecond after the second positive pulse an output pulse will appear at output terminal 537 of the single pulse generator.

When latches 530 and 531 are energized, the output terminal of inverter 527 is Down resulting in input terminal 19A of And circuit 526 being Down. Thus, once latches 530 and 531 are energized, the impressing of a third and subsequent positive pulses on input terminals 521 and 522 of the single pulse generator will not result in an output pulse at output terminal 537. Accordingly, the circuit is referred to as a single pulse generator.

Now assume that transfer contact 538 is transferred for a short interval of time and thereby grounds terminal 538A. This will result in de-energizing latches 530 and 531. Now when transfer contact 538 is returned to its alternate position (namely, the grounding of contact 538B), the second positive pulse thereafter, resulting in input terminals 521 and 522 assuming respectively the Up condition, will result one microsecond later in a single output pulse appearing at terminal 537 of the single pulse generator. The succeeding positive pulses appearing on terminals 521 and 522 will not result in output pulses at terminal 537 as long as there is no interruption in the energization of the latches 530 and 531. The immediately preceding description of the single pulse generator is very similar to the embodiment that is hereinafter employed in the novel checking circuit herein disclosed.

Referring to Fig. 2A: the block labelled D–3750 represents an electrostatic storage system generally of the type disclosed in the U. S. patent application of Deerhake et al., Serial No. 444,253 filed July 19, 1954, of common assignee herewith. This storage system has sixty-six data lines that are utilized for conveying information to and from said storage system. In Fig. 2A, only a small number of these data lines are shown. However, the sixty-six data lines correspond identically with the sixty-six data line terminals shown and fully described in the U. S. patent application of Deerhake et al., Serial No. 434,548, filed June 4, 1954, of common assignee herewith.

A brief description of the sixty-six data lines is in order. The sixty-six data lines are divided into sixteen groups of four and one group of two. Each group of the sixteen groups has a 1 bit line, a 2 bit line, a 4 bit line and an 8 bit line. The two lines of the seventeenth group are a 1 bit and a 2 bit line. The data lines for the first group of four may constitute the data lines that convey in a numerical system the lowest decimal digit. The next group may represent the next higher decimal digit, etc. through the sixteen groups. The seventeenth group is utilized to convey the indicator related to the information that is conveyed on the first sixteen groups.

Now again referring to Fig. 2A, it will be seen that data line DL1–1, DL1–2, DL1–4 and DL1–8 constitute the 1 bit, the 2 bit, the 4 bit and the 8 bit data lines of the first decimal digit or position. The second decimal digit data lines are not shown but will be labelled as follows: DL2–1, DL2–2, DL2–4 and DL2–8. The data lines conveying the third through sixteenth decimal digits (or position information) would be correspondingly numbered. The two data lines making up the seventeenth group of data lines will be labelled DL17–1 and DL17–2. From Fig. 2A, it will be seen that only the data lines corresponding to the first decimal position, the data lines DL16–4 and DL16–8 of the sixteenth decimal position, and data lines DL17–1 and DL17–2 are shown.

The checking circuit represented by block D–4474 in Fig. 2A is fully disclosed and claimed in the U. S. patent application Serial No. 434,548 of W. J. Deerhake et al. filed on June 4, 1954, and entitled "Checking Circuit." The checking circuit represented by block D–4474 will hereinafter be referred to as the Modulo 4 checking circuit. The Modulo 4 checking circuit has sixty-six input terminals, one corresponding to each of the data lines. The sixty-six input terminals of the Modulo 4 checking circuit are respectively connected to the sixty-six data lines. Referring to Fig. 2A, it will be seen that not all sixty-six but only the input terminals corresponding to the data lines shown in Fig. 2A are shown. The Modulo 4 checking circuit has two output terminals labelled E523 and E620. Output terminal E523 is a greater-than-9 check failure terminal, that is, it will be in the Up condition for a short time interval as a result of the Modulo 4 checking circuit detecting a greater-than-9 error. A greater-than-9 error may briefly be defined as the existence of a decimal value greater than 9 within any one of the sixteen decimal positions. That is, if within any decimal position the 8 bit and the 2 bit, or the 8 bit and the 4 bit, are simultaneously present an error exists as to the information represented within this decimal position. Output terminal E620 may be referred to as a Modulo 4 check failure terminal and will be in the Up condition a short time interval after a Modulo 4 error has been detected. What constitutes a Modulo 4 error is fully set forth in the afore-mentioned Deerhake et al. U. S. patent application.

Briefly, a Modulo 4 error will usually exist when a binary "1" in any of the sixteen decimal positions or the seventeenth decimal position is spuriously introduced or omitted in a word appearing on the data lines. Actually, a Modulo 4 error may exist when a plurality of spurious binary 1's are either introduced or omitted in information represented within the seventeen decimal positions. It will be appreciated that it is entirely possible, depending on the type of error, that the Modulo 4 checking circuit will detect both a greater-than-9 error and a Modulo 4 error within the same word, the word being expressed in coded notation. In this illustrative embodiment the coded notation is the pure binary-decimal system. The Modulo 4 checking circuit and its operation will be more clearly understood from the detailed description of the entire invention hereinafter.

The checking circuit represented by block D–4474 in Fig. 2A may be referred to as a "word" and "bit" checking circuit.

Now again referring to Fig. 2A it will be seen that block D266 is representative of sixty-six Modulo 2 latches, that is, a Modulo 2 latch for each data line. From the earlier discussion of a Modulo 2 latch in particular, and the sixty-six as a group, it will be recalled that each Modulo 2 latch had an input terminal, a clear terminal and an accept terminal. The sixty-six clear terminals are commonly connected through a cathode follower circuit to Modulo 2 clear terminal 661.62. The sixty-six accept terminals are commonly connected through a cathode follower to Modulo 2 accept gate terminal 661.18. The accept gate terminal 661.18 that controls all sixty-six Modulo 2 latches is shown in Fig. 2A, as is the Modulo 2 clear terminal 661.62 that also controls all sixty-six Modulo 2 latches. The sixty-six input terminals of the Modulo 2 latches (one input terminal for each latch) are respectively connected to the sixty-six data lines.

Each Modulo 2 latch has a lamp indicating whether the Modulo 2 latch is energized or de-energized. Viewed from another aspect, this lamp may be thought of as indicating whether the Modulo 2 latch is in an even or odd condition. Only four lamps, each corresponding to its respective Modulo 2 latch, are shown in Fig. 2A. From right to left the sixty-six lamps would be labelled: IL1–1, IL1–2, IL1–4, IL1–8, IL2–1, IL2–2, IL2–4, IL2–8 and so on through IL17–2. Lamp IL1–1 corresponds to data line DL1–1. Lamps IL1–2 through IL17–2 each correspond to a data line. Thus it will be apparent in view of the earlier discussion of a Modulo 2 latch in detail, that if a plurality of words in succession are impressed on the sixty-six data lines and the sixty-six Modulo 2 latches are conditioned to accept these words, that the lamps by being On or Off would indicate whether an even or an odd number of binary 0's had been accepted. For example, if lamp IL9–4 (not shown) is On after said plurality of words has been impressed on the data lines and accepted by the Modulo 2 latches, the following conclusion can be drawn: the total number of binary 0's representing the 4 bit of the ninth decimal position of this plurality of words is an odd number. Further, as to the remaining sixty-five lamps the same conclusion may be drawn as to the information that was impressed over the data lines corresponding to these lamps.

Now still referring to Fig. 2A, it will be seen that the Modulo 4 error terminal E620 and the greater-than-9 error terminal E523 are each connected to block D260. Block D260 represents the Modulo 4 error latch and the four address group error latches. There are four address group latches, namely, A, B, C, and D. Each of the address group latches has a lamp associated with it, that is, when address group error latch A is energized lamp $L_a$ will be On; when address group error latch B is energized lamp $L_b$ will be On; when address group error latch C is energized lamp $L_c$ will be On; and when address group error latch D is energized lamp $L_d$ will be On. Also when the Modulo 4 error latch is energized lamp $L_{er}$ will be On.

Now referring to block D–3750, the four terminals labelled TSA, TSB, TSC and TSD respectively, are the tube selector terminals.

Block D261 of Fig. 2A represents visual cathode ray tube error indicator apparatus and will hereinafter be referred to as visual CRT error indicator. The details of the circuitry of this block, as well as all of the other blocks of Fig. 2A will be explained hereinafter. However, at this stage it is only necessary to appreciate that the visual CRT error indicator includes four cathode ray tubes having conventional screens so as to render a visual indication when said screens are bombarded by an electron beam. The four tubes, the faces of which are shown by circles within block D261 are labelled VIA, VIB, VIC and VID. In many respects each of these four tubes may be thought of as respectively corresponding, each to one of the lamps associated with the four group address error latches. The correspondence being as follows: address group error lamp $L_a$ and cathode ray tube VIA; address group error lamp $L_b$ and cathode ray tube VIB; and correspondingly as to lamps $L_c$, $L_d$ and cathode ray tubes VIC and VID, respectively.

It will now be noted that terminal 5219 of block D260 is connected to terminal 5219A of block D261. Further, it will be appreciated that the tube selector terminals of block D–3750 are connected as follows to the enumerated terminals of blocks D260 and D261: terminal TSA is connected via lead A10 to terminal TSA1 of address group error latch A and to terminal TSA2 of the visual CRT error indicator; terminal TSB is connected via lead B10 to terminal TSB1 of group address error latch B and to terminal TSB2 of visual CRT error indicator; terminal TSC is connected via lead C10 to terminal TSC1 of group address error latch C and to terminal TSC2 of visual CRT error indicator; and terminal TSD is connected via lead D10 to terminal TSD1 of group address error latch D and to terminal TSD2 of visual CRT error indicator.

It will also be seen that block D3750 has a terminal 704 that is connected via lead A25 to terminal T704 of block D260.

Block D262 of Fig. 2A represents a single pulse generator, the Modulo 2 control latch and the Modulo 2 accept gate circuit. It will be seen that terminals T308, T194 and T43B of block D262 are respectively connected to terminals 308, 194 and 43B of block D3750. Also that terminal T661.18 of block D262 is connected via lead A20 to Modulo 2 accept gate terminal 661.18 of block D266.

Block D263 of Fig. 2A represents four pushbuttons and their immediately associated circuitry. These pushbuttons, may for convenience, be labelled, The Count Modulo 2 Pushbutton, The Modulo 2 Reset Pushbutton, The CRT Check Reset Pushbutton and The Address Group Reset Pushbutton. From Fig. 2A it will be seen that terminals 661.60 and 661.61 of block D262 are respectively connected via leads A21 and A22 to terminals T661.60 and T661.61 of block D263. Also, that terminal T661.62 of block D263 is connected via lead A23 to Modulo clear terminal 661.62 of block D266 and terminal 786.05 of block D263 is connected via lead A24 to terminal T786.05 of block D260.

The electrostatic storage system represented by block D3750 in Fig. 2A is fully disclosed and claimed in U. S. patent application Serial No. 444,253, filed July 19, 1954. The terminals of block D3750 to which the novel checking circuit herein disclosed is connected are the following: (read-in terminal RIT shown in Fig. 2D of the drawing of the above-identified U. S. patent application); terminal 308 shown in Fig. 6A of the above-identified U. S. patent application; terminal 194 shown in Fig. 6D of the above-identified U. S. patent application; terminal 43B shown in Fig. 19D (Or circuit 605) of the above-identified U. S. patent application; terminal 704 shown in Fig. 19H of the above-identified U. S. patent application; and terminals TSA, TSB, TSC and TSD each shown in Fig. 19F of the above-identified U. S. patent application.

The data line terminals shown in Fig. 2A of this application are shown in Figs. 2D and 2E of U. S. patent application Serial No. 444,253, filed on July 19, 1954. The data line terminals of the above-identified U. S. patent application (Figs. 2D and 2E), the data lines shown in Fig. 2A of the instant application and the data line terminals shown in Figs. 2 and 3 of U. S. patent application Serial No. 434,548, filed June 4, 1954, are all labelled alike, that is, DL1–1, DL1–2, DL1–4, DL1–8, etc.

The apparatus disclosed and claimed in U. S. patent application Serial No. 444,253 of Deerhake et al. filed on July 19, 1954, may be summarized as follows:

The high speed storage arrangement of the Deerhake et al. application is an electrostatic storage system of the binary type or an electrostatic storage system of the binary-decimal type.

In the binary-decimal storage system, a regeneration counter is provided for generating sequential voltages representative of each binary-decimal digit or bit from 0–1999 inclusive, corresponding to the 2,000 addresses. Each cathode ray tube accommodates 500 addresses. Four cathode ray tubes are connected in parallel to accommodate the storage of one binary bit at each of the 2,000 addresses. Hence, 4×4 or 16 cathode ray tubes are required to effect the storage of one decimal digit. A tube selector is employed to select one of each four parallel connected cathode ray tubes for operation during each cycle.

The output terminals from the regeneration counter and a similar group of termnials (from computer) for receiving similar voltage values are connected to the inputs of a two position electronic switch which permits transfer of voltages from the latter group of terminals during an action cycle when information is to be read in or read out at preselected addresses and permits transfer of the voltages from the regeneration counter during a regeneration cycle when information stored is to be refreshed or regenerated. Each regeneration or action cycle is performed in eight microseconds. The regeneration cycle is continuously repeated unless an action cycle is called for.

Each of the one microsecond voltages supplied by the switch is applied to a pulse stretcher to provide a voltage during the entire eight microsecond cycle for effecting the selective positioning of the electron beam and operation of the tube selector.

The outputs of the pulse stretchers are selectively connected through inverters to the horizontal and vertical deflection circuits and to the tube selector to effect beam deflection and cathode ray tube selection in accordance with the binary-decimal digits represented by the various voltages or outputs. The various voltages are assigned weighted values consistent with the addresses raster employed and effect a horizontal or vertical beam deflection, as the case may be, in accordance with that weighted value.

These weighted values are transferred into actual beam deflection by similar horizontal and vertical deflection circuits which control the voltage at the horizontal and vertical deflection plates, respectively, of the cathode ray tubes. Each deflection circuit includes a group of switches for individually switching their current flow between two constant voltage lines having a total current flow of constant value. Voltage stabilizing means are connected between each constant voltage line and the corresponding pair of deflection plates to provide a voltage change thereat proportional to the current change in that constant current line. Hence, beam deflections are provided in accordance with the voltages presented by the regeneration counter and the computer.

A binary 0 is stored as a dot and a binary 1 is stored as a dash. A dot is written by turning on the beam when it is stationary. A dash is written by first writing a dot followed by turning on the beam when it is selectively moved under the influence of a bit sweep generator.

In the defocus-dash system the beam is defocused when a dot is written and focused as the beam is moved when a dash is written.

Read in and read out to the entire voltage system is effected simultaneously or in parallel.

A pickup plate is in abutment with the face of each cathode ray tube to effect read out therefrom. The signal read out is applied to a video amplifier and if positive represents a dash and if negative represents a dot.

The turning on of the beam to effect read out causes a new dot to be written. Hence, if the output of the video amplifier is negative the beam is then turned off and if positive the beam is allowed to remain on to effect destruction of the new dot and writing of a dash.

Detector means and pulse stretcher means responsive to an On pulse are employed to exhibit, by the time a certain terminal (596) is Up, whether a dot or dash is present. Circuits connect this terminal to a data line terminal which is Up during a certain time to indicate a dash and Down during that time to indicate a dot. If a dash is present a dash termination pulse effects circuits to cause the electron beam to be turned Off at the beginning of the next cycle after storing or regeneration of the dash is completed. Hence, the circuit operation during a regeneration cycle and an action read-out cycle is identical.

An action read-in cycle is initiated by causing a read-in control terminal (RIT) to be Up. This permits the stored information to be again read out at the data line terminal and prevents that information from being again stored. The new information to be stored is applied to the data line terminal and transferred into storage.

An electrostatic storage system accommodating 1024 addresses (32×32) is shown. This system is of the pure binary type and action and regeneration cycles occur alternately. If information is neither read in nor read out during an action cycle such is termed an action blank cycle. The teachings of the circuit technique employed in the binary-decimal embodiment are employed in the binary embodiment.

For purposes of explanation it will be convenient to refer to the four cathode ray tubes associated with each of the sixty-six data lines as a cathode ray tube storage unit, or CRT storage box. Each cathode ray tube storage unit or CRT box has an A tube, a B tube, a C tube and a D tube. Each of the cathode ray tubes of a cathode ray tube storage unit can readily accommodate 500 bits. Thus, a cathode ray tube storage unit having four cathode ray tubes can readily accommodate 2000 bits. The A tube of each cathode ray tube storage unit will store the 0, 2, 4, 6 and 8 through 998 (i. e. only even) address bits. The B tube of each cathode ray tube storage unit will store the 1, 3, 5, 7 and 9 through 999 (i. e., only odd) address bits. The C tube of the cathode ray tube storage unit will store the 1,000, 1002, 1004, 1006 and 1008 through 1998 (i. e., only even) address bits. The D tube of each cathode ray tube storage unit will store the 1001, 1003, 1005, 1007 and 1009 through 1999 (i. e., only odd) address bits. The storage pattern, that is, the geometrical arrangement of the bits in storage tubes A, B, C and D of each of the sixty-six storage units is shown in Figs. 12A, 12B, 12C and 12D of U. S. patent application Serial No. 444,253.

The storage method employed in the afore-recited U. S. patent application is either the dot-dash system or the focus-defocus system. However, it will be appreciated that the checking circuit hereindisclosed is not limited to any particular method of cathode ray tube storage. For example, the method of Cathode-Ray Tube Storage disclosed and claimed in the J. C. Logue et al. U. S. patent application Serial No. 440,744, filed on July 1, 1954, could be employed.

The visual CRT error indicator of Fig. 2A, it will be recalled, has four cathode ray tubes labelled VIA, VIB, VIC and VID. The tubes VIA through VID of the visual CRT error indicator correspond respectively to the tubes A, B, C and D of each of the sixty-six cathode ray tube storage units. At this point it will suffice merely to point out that actually what occurs is that a visual pattern is diplayed on the four cathode ray tubes of the visual CRT error indicator that corresponds (as to location or geometrical arrangement) to the storage pattern of each of the storage display arrangements or patterns of the sixty-six cathode ray tube storage units. This is accomplished by having all sixty-six of the cathode ray tube storage units contained within block D3750 of Fig. 2A in exact synchronism with each other and with the four tubes of the visual CRT error indicator.

At this point, it may be well to point out the broad function of the various components of Fig. 2A. As stated earlier block D3750, representative of the disclosure of U. S. patent application Serial No. 444,253 has sixty-six cathode ray tube storage units. Each storage unit or CRT box has four cathode ray tubes in parallel for receiving information in the form of a dot or dash electrostatic storage manifestation from a single data line. The four tubes of each cathode ray tube storage unit are labelled A, B, C and D. All sixty-six CRT storage units function in exact synchronism. Further, visual CRT indicator D261 has four cathode ray tubes, namely, VIA, VIB, VIC and VID, that function in exact synchronism with the sixty-six CRT storage units of D3750.

Now let it be assumed that the storage unit represented by D3750 has accepted, and without error, stored 2000 bits (binary 0's or binary 1's) per CRT storage unit. In other words, storage unit D3750 has effectively stored in it 2000, 66-bit words, i. e. 200 addresses. Further, let it be assumed that when the 2000 words successively appeared on the data lines, and where accepted by storage unit D3750, that the sixty-six Modulo 2 latches included within block D266 were so conditioned throughout this entire time as to accept these 2000 words for even-odd determination as to the binary 0's conveyed over the respective data lines. Thus, various lamps of the sixty-six Modulo 2 latches may be On and others Off, depending on whether the particular latch associated with a lamp accepted an even or odd number of binary 0's.

For purposes of explanation at this point, let it be assumed that a certain bit address has a binary 1 stored thereat. Further, let it be assumed that the Modulo 2 latch associated with the data line corresponding to this bit address has reflected the presence of this binary 1. It will be appreciated that during each subsequent regeneration cycle, and in particular when this binary 1 is correctly regenerated or refreshed, it would lead to an erroneous indication for the Modulo 2 latch, to in any way change its condition. However, assume that a new word is accepted. for storage at the address corresponding to the bit address of the binary 1 and that the particular bit to be stored at this address is now a binary 0. Then obviously, the Modulo 2 latch associated with the data line corresponding to the bit address must reflect the fact that the binary 1 has been changed to a binary 0. (It will be appreciated that if the conditions were reversed, i.e., initially a binary 0 stored thereat and subsequently a binary 1, that the Modulo 2 latch would also have to reflect this change). Briefly, these conditions can be set down for a single Modulo 2 latch as follows: when the bit stored at a particular bit address has been reflected or taken into account by the Modulo 2 latch corresponding to that address, then the Modulo 2 latch need not take cognizance of the mere refreshing of the particular bit stored at said address. However, whenever a binary 0 is stored at a particular bit address and it is erased, no matter whether the new word will store a binary 1 or a binary 0 at this bit address, the Modulo 2 latch associated with the particular bit address must reflect this change (the particular Modulo 2 latch will change its condition once if a binary 1 replaces the binary 0 and twice if a binary 0 replaces a binary 0). On the other hand, if a binary 1 is stored at a bit address, and this binary 1 is erased and a new binary 1 corresponding to the new information is written at this address, the counter or Modulo 2 latch associated with this address will reflect this change (though the particular Modulo 2 latch will not actually change its condition). However, if in place of the binary 1 a binary 0 had been written at this address, the Modulo 2 latch would reflect this change by changing its condition.

In conclusion, it may be stated that when data is Read-In, the previously stored data is Read-Out. Therefore the condition (i. e., Up or Down) of the data lines must be reflected by the sixty-six Modulo 2 latches during Read-In (N.4 time) and during Read-Out (N.5 time).

When the 2000 words successively appeared (parallel order by bits per word) on the data lines and were accepted for storage by block D3750 the Modulo 4 checking circuit represented by block D4474 checked each word for a greater-than-9 error and for a Modulo 4 error, i. e., the spurious introduction or omission of a binary "1."

Now under the conditions of this example, we assumed that during the read-in of the afore-recited 2000 (66-bit) words into storage unit D3750 no error occurred. Hence, no error was detected.

No Modulo 2 count is made during read-out from storage. A Modulo 2 count is made only when new data is written into storage, at which time new data and old data at selected address are each accepted by the sixty-six Modulo 2 latches.

Further, any word when appearing on the data lines in parallel by bit order will be checked by the Modulo 4 checking circuit for a greater-than-9 error and a Modulo 4 error. It is assumed that no error has occurred.

At this point, storage unit D3750 has stored therein 2000, 66-bit words. Now let us assume that upon instruction from the calculator or other apparatus, the storage unit accepts for storage without error in serial-by-word, parallel-by-bit order, five new words. Also that the sixty-six Modulo 2 latches are properly conditioned (at N.4 time, i. e., Read-In time) so as to accept the new five words. Further, that the sixty-six Modulo 2 latches are properly conditioned (at N.5 time, i. e., Read-Out time) so as to accept the old five words and thereby reflect the fact that an even or odd number of binary 0's are stored within the respective CRT storage units.

Let it now be assumed that during a regeneration cycle during which a particular address is being regenerated a decimal value greater than 9, within one of the sixteen digit positions, is detected. For example, this error could be due to data line DL1–8 being in the Up condition simultaneously with data lines DL1–1, DL1–2, and DL1–4. (That is, a spurious binary "1" in the 8 bit position of digit position 1 which results in the effective value within digit position 1 of the said word being of decimal value 15.) The Modulo 4 checking circuit would detect the error in the first digit position of said word, namely, a decimal value greater than 9. The Modulo 4 checking circuit D4474 would emit a pulse via greater-than-9 error terminal E523. The pulse appearing on terminal E523 would be conveyed via lead 4CA to the calculator for control purposes. The pulse of the greater-than-9 error terminal E523 would also be conveyed to terminal T523 of block D260 resulting in the Modulo 4 error latch being energized, error lamp $L_{er}$ being turned On, one of the four group address latches being energized, and the lamp corresponding to the energized group address latch being turned On.

It was seen that due to the greater-than-9's error occurring within digit position "1" a pulse emitted from terminal E523 energized one of the four group address latches. The particular group address latch energized will depend on what tube (i. e., what address) i. e., A, B, C or D of the sixty-six cathode ray tube storage units the word in which the Modulo 4 checking circuit detected an error is stored. Let us assume that it was the B tube. Then group address error latch B and group address error lamp $L_b$ will be energized.

In addition to group address error lamp $L_b$ being energized, a pulse will be emitted by terminal 5219 of block D260 and accepted by terminal 5219A of the visual CRT error indicator. This pulse will be so synchronized with a pulse emitted by block D3750, terminal TSB thereof, that an indication of the relative location of the erroneous bit on the face of cathode ray tube VIB will be given.

As was explained earlier, the visual CRT error indicator is in exact synchronism with each of the sixty-six cathode ray tube units (i. e., CRT boxes) contained with storage unit D3750. Essentially, the indication of the relative location (i. e., address) of the erroneous bit on the visual CRT error indicator is accomplished as follows: tubes VIA, VIB, VIC and VID, respectively, and in synchronism with the position of the beam in tubes A, B, C and D of each of the sixty-six cathode ray tube storage units, illuminates a small spot corresponding to each address (i. e., elemental area) of the CRT storage boxes. In other words, there are five hundred small illuminated spots on each of the tubes VIA, VIB, VIC and VID and each of these small illuminated spots corresponds in relative position to the elemental storage areas (addresses) of the tubes within each of the sixty-six cathode ray tube storage units.

Now when an error is detected by the Modulo 4 checking circuit as explained above, a pulse is impressed on terminal 5219A. This pulse, due to its timing, will place a second illuminated spot adjacent a first illuminated spot on one of the four cathode ray tube storage units of the visual CRT error indicator. Under the conditions of this example, this second illuminated spot or error spot will be adjacent one of the five hundred illuminated spots on the face of cathode ray tube VIB. It will be appreciated that in normal operation this would give the operator an indication as to within which group of tubes (i. e., A, B, C or D) namely, tube B under the condition of this example, of the sixty-six storage units the error is located.

Actually, the operator could obtain this information (i. e., that the erroneous bit is at an address stored in the B tubes) from the fact that group address error lamp $L_b$ is energized. However, the double dot indicating the address on the face of cathode ray tube VIB narrows down the location of the error. Though, at this time all the operator can tell, as to the location of the error, is that it is at a certain address of tube B of any one of the sixty-six cathode ray tube storage units. It is obvious now that it is desirable that some means be provided for determining in which of the sixty-six cathode ray tube storage units (one associated with each data line) the erroneous information is stored. The means for making this determination is essentially the sixty-six Modulo 2 latches, indicator lamps and control apparatus associated therewith.

In order to determine in which of the sixty-six cathode ray tube storage units the error is located, the operator will depress the count Modulo 2 pushbutton. At this time only the overall results of depressing and releasing the count Modulo 2 pushbutton will be explained. The depressing and releasing of the count Modulo 2 pushbutton results immediately in the storage unit D3750 resetting to address 0. Now the storage unit D3750 will proceed to regenerate and during the first complete regeneration cycle, i. e., ordered sequence of addresses 0 through 1999, the data at each address will appear on the data lines and be accepted by the sixty-six Modulo 2 latches (under control of the Modulo 2 control latch hereinafter explained in detail). As these words consisting of sixty-six binary bits are regenerated, they appear on the sixty-six data lines. Further, the depressing and releasing of the count Modulo 2 pushbutton results in so conditioning the sixty-six Modulo 2 latches of block D266 that they will accept the entire number of words stored in storage unit D3750.

In brief, each of the cathode ray tube storage units will, during a first eight microsecond cycle, impress on the data lines the bit appearing at address 0 and during a second eight microsecond cycle the sixty-six cathode ray tube storage units will simultaneously impress a second word (i. e., address 1) on the data lines. This will continue throughout the entire 2000 addresses. During each eight microsecond cycle, at the particular time at which a word is impressed on the sixty-six data lines, the Modulo 2 latches will be conditioned to accept said word. (Since the Modulo 2 control latch is energized.)

Actually, except during an action cycle consisting of eight microseconds, or a plurality of successive action cycles, the storage unit represented by block D3750 will be running through a succession of eight microsecond regeneration cycles. During each regeneration cycle a single word is regenerated (i. e., refreshed). During this conventional regeneration cycle the word at the address being regenerated appears on the data lines but is not accepted by the Modulo 2 latches. The word is, however, checked by the Modulo 4 checking circuit.

It is to be appreciated that the depressing and releasing of the count Modulo 2 pushbutton accomplishes regeneration of each of the words contained within storage in a conventional manner (precluding an action cycle from occurring) and in an ordered sequence, address 0 through 1999. Also, the depressing and releasing of the count Modulo 2 pushbutton conditions the Modulo 2 latches to accept the words appearing on the data line only during the 2000 eight microsecond regeneration cycles necessary to regenerate all of the addresses 0 through 1999.

Now after storage unit D3750 has regenerated all 2000 addresses and the 2000 words have been accepted (a second time) by the sixty-six Modulo 2 latches, the information stored at these 2000 addresses is reflected in the pattern of the indicator lamps, namely, IL1–1 through IL17–2. Under the conditions of the afore-recited example, all of the indicator lamps except lamp IL1–8 will be Off; indicator lamp IL1–8 will be On. Indicator lamp IL1–8 corresponds to data line DL1–8 (the 8 bit line of digit position 1) and will be in the On condition since the Modulo 2 latch associated with said data line and said indicator lamp accepted an odd number of binary 0's. This indicates that an error occurred at a bit address within the CRT storage unit (i. e., CRT box) corresponding to data line DL1–8. The operator can now determine (from viewing the indicator lamps and the visual CRT indicator) at what address, in what tube, in what CRT box, the erroneous information is stored.

The operator knowing the location of the error, i. e., the particular CRT storage unit (CRT box) and address, can take the necessary steps to remove the error. These steps form no part of the present invention, but are well known to those skilled in the art.

When the error has been removed it is desired to get the apparatus back in operation. To accomplish this the operator would depress the CRT check reset pushbutton represented in Fig. 2A as being included in block D263. The depressing of the CRT check reset pushbutton accomplishes the following: (1) the sixty-six Modulo 2 latches included within block D266 are all cleared, that is, deenergized; (2) the address group error latches included within block D260 are all reset, that is, deenergized; and (3) the Modulo 4 error latch included within block D260 is de-energized. The releasing of the CRT check reset pushbutton accomplishes the following: the sixty-six Modulo 2 latches accepting the information impressed on the data lines at eight microsecond time intervals during one regeneration cycle of the entire 2000 addresses.

It is apparent, now that the error has been corrected and the sixty-six Modulo 2 latches have once accepted all the information in storage unit D3750, that the apparatus is in condition to proceed.

From the foregoing discussion, it will be apparent that the Modulo 4 checking circuit functions at all times, that is, every time a word is manifested by the Up-Down condition of the sixty-six data lines, the Modulo 4 checking circuit will perform a greater-than-9 check and a Modulo 4 check. The Modulo 4 checking circuit checks an entire word at a time. Since the words appear on the sixty-six data lines serial-by-word, parallel-by-bit, the Modulo 4 checking circuit may be thought of as a word checking circuit where each word occurs parallel-by-bit and a group of words occurs in serial order.

The sixty-six Modulo 2 latches represented as being included within block D266 may be thought of as serial bit checking devices. As was pointed out earier, each Modulo 2 latch checks as to whether an even or odd number of binary 0's in serial order have been manifested on the data line corresponding to said Modulo 2 latch and accepted thereby. Once an error has occurred and been detected by the checking circuits, the visual CRT indicator will continue to show by a double dot the address within one of the sixty-six CRT storage units of the erroneous word. This is true since storage unit D3750 continually regenerates its entire contents and this information appears on the sixty-six data lines and is checked by the Modulo 4 checking circuit even though it may not be accepted by the sixty-six Modulo 2 latches.

When the operator observes from the group address error lamps and the visual CRT indicator that an error has occurred, he may proceed as follows: (1) Cause the entire contents of storage unit D3750 to be accepted by the sixty-six Modulo 2 latches. This will result in one or more of the sixty-six indicator lamps of the sixty-six Modulo 2 latches being On indicating which CRT storage unit, or units, corresponding to the indicator lamp, or lamps, that are On contain the error, or errors.

The address of the error (or the addresses of the errors) will be given by the visual CRT indicator. (2) The operator can now withdraw the erroneous word stored at the indicated address to a register not shown. Once the incorrect word is stored in a first register, the operator can enter the correct word in a second register via a manual keyboard. The operator can then Read-In the correct word to storage. The first register, the second register, and the keyboard apparatus for correcting the error are not shown in this application and form no part of the present invention herein disclosed. However, numerous means (including a first register, second register, etc.) for performing the above function, are known to those skilled in the art.

After the operator has corrected all errors: (3) The Modulo 2 reset pushbutton could now be used to merely reset the sixty-six Modulo 2 latches.

(4) The count Modulo 2 pushbutton could now be twice energized to accept the entire contents of storage unit D3750, a first and second time. After the entire contents of storage unit D3750 has been twice accepted, all of the indicator lamps of the sixty-six Modulo 2 latches should be Off if the error has been corrected.

If all of the indicator lamps are Off, the following step, namely, the depressing of the CRT check reset pushbutton can be taken. (5) The depressing of the CRT check reset pushbutton accomplishes the functions set out earlier herein, which are, the resetting of the Modulo 4 error latch, the resetting of the address group latches, and the resetting of the sixty-six Modulo 2 latches. The releasing of the CRT check reset pushbutton results in the sixty-six Modulo 2 latches accepting all of the information stored in storage unit D3750 a first time.

It is also to be appreciated that the depressing of the group address reset pushbutton at any time will merely reset the four group address error latches (but they will not remain reset if an error is still in the system).

Now before the complete novel checking circuit herein disclosed and claimed is gone into in detail, it is desirable to briefly point out how certain commonly occurring components and structure whose function was stated in connection with Fig. 2A operate.

Referring to Fig. 7, it will be seen that Figs. 3, 4, 5, 6, 9 and 10 of the drawing are to be placed together in order to disclose the complete checking circuit. Fig. 7, it is to be appreciated, does not include the showing of the apparatus represented by blocks D3750 and D4474 of Fig. 2A. The apparatus represented by blocks D3750 and D4474 is respectively disclosed and claimed in the following U. S. patent applications: Serial No. 444,253 and Serial No. 434,548.

The structure represented by block D261 in Fig. 2A is similar to that of Figs. 19E and 19G of U. S. patent application Serial No. 444,253 and shown herein in Figs. 9 and 10.

Referring to Fig. 3 of the drawing, it will be seen that there are four pushbuttons enclosed within broken lines and respectively labelled Count Modulo 2 Pushbutton, CRT Check Reset Pushbutton, Modulo 2 Reset Pushbutton and Address Group Reset Pushbutton. Actually these pushbuttons are single pole double throw switches that have a normal position when the pushbutton is not depressed and a second position when the pushbutton is depressed. For example, viewing the pushbutton labelled Count Modulo 2 when not depressed, this pushbutton will accomplish the impressing of a —35 volt potential on the right input of Or circuit 5130. When this same pushbutton is depressed it will impress a positive 10 volt potential on the same input terminal of Or circuit 5130.

In a similar manner the CRT check reset pushbutton will effect the impressing of approximately +10 volts on the left hand input terminals of And circuits 5193 and 5196 when not depressed. Also, when the CRT check reset pushbutton is not depressed, the input of amplifier switch 5133 will be Down, i. e., approximately —35 volts. Now when the CRT check reset pushbutton is depressed a negative potential of approximately 35 volts will be impressed on the left hand inputs of And circuits 5193 and 5196. Also, when the CRT check reset pushbutton is depressed a positive potential of approximately 10 volts will be impressed on the input of amplifier switch 5133.

Now referring to the Modulo 2 reset pushbutton, it will be seen that when this pushbutton is not depressed a —35 volt potential will be impressed on the input of amplifier switch 5134, whereas, when this pushbutton is depressed, a positive potential of approximately 10 volts will be impressed on the input of said amplifier switch.

Referring to the address group reset pushbutton, it will be seen that in the undepressed position a positive potential of approximately 10 volts is impressed on the right input of And circuit 5196, whereas, when this pushbutton is depressed a minus potential of approximately 35 volts is impressed on the input of said And circuit.

In Fig. 3, the normal or undepressed position of each of the afore-recited pushbuttons is labelled N. C. whereas the depressed position is labelled N. O.

Further, the terms "a negative potential of approximately 35 volts" are synonomous with the terms "Up condition" and "Down condition" (i. e., Up or Down).

Still referring to Fig. 3 it will be seen that: the count Modulo 2 pushbutton and Or circuit 5130 control amplifier switch 5132 which in turn controls relay R5132; the CRT check reset pushbutton controls amplifier switch 5133 which in turn controls relay R5133; and the Modulo 2 reset pushbutton controls amplifier switch 5134 which in turn controls relay R5134.

Also shown in Fig. 3 of the drawing and enclosed within a broken line labelled accordingly, is the Modulo 4 error latch. The Modulo 4 error latch includes And circuit 5193, Or circuit 5192 and delay circuit 5191. The Modulo 4 error latch differs a little from the latch shown in Fig. 1Y and disclosed in detail earlier herein. However, the differences can readily be appreciated and the mode of operation of each understood by the following brief description. Referring to the Modulo 4 error latch, consider that the right input of Or circuit 5192 is Up for a microsecond (for example, any one of the eight time intervals making up an eight microsecond octal cycle). When the right input of Or circuit 5192 is Up the ouput of said Or circuit, and the input of delay circuit 5191 will be Up. One microsecond after the input of delay circuit 5191 is Up the output of said delay circuit and the right input of And circuit 5193 will be Up. Now if the left input of And circuit 5193 is simultaneously in the Up condition with the right input of said And circuit the Modulo 4 error latch will be energized and will remain energized until the left input of And circuit 5193 switches to the Down condition.

To briefly summarize, it was seen that an Up pulse impressed on the right input terminal of Or circuit 5192 will energize or latch the Modulo 4 error latch if the left input terminal of And circuit 5193 is Up.

Referring to Figs. 3 and 4 of composite Fig. 7, it will be seen that the Modulo 4 error latch controls amplifier switch 5190 which in turn controls relay R5190. When relay R5190 is energized, the Modulo 4 error lamp $L_{er}$ will be On.

Referring to Fig. 4, shown each within a labelled broken line are group address error latch A, group address error latch B, group address error latch C and group address eror latch D. The two position switch of group address error latch A is represented by its components, And circuit 5197A, And circuit 5197B and Or circuit 5197C. The two position switches of each of the remaining three latches are identical to the two position switch of group address error latch A. Further, each of the four group address error latches operate in identically the same manner as the latch shown in Fig. 1Y and fully disclosed earlier herein.

To briefly review how a latch of the type under discussion functions, let us consider group address error latch D. Assume that the third from the left input (302A) of two position switch 5200 is Up. Then if for a microsecond the inputs (300A and 301A) of two position switch 5200 are respectively in the Up condition, the output of delay circuit 5204 will be Up one microsecond later. Inputs 300A and 301A of switch 5200 are respectively connected to terminal TSD1 and to junction 5195A (Fig. 3). When the output of delay circuit 5204 is Up the fourth from the left (303A) input terminal of two position switch 5200 will be Up. Now when terminals 302A and 303A are simultaneously Up group address error latch D will be energized and will remain energized until terminal 302A assumes the Down condition. It will be seen that when group address error latch D is energized, amplifier switch 5208 is energized and this switch in turn energizes relay R5208. When relay R5208 is energized, group address error lamp $L_d$ is On.

Group address error latches A, B, and C each function in a similar manner to that of group address error latch D. Controlled by group address error latch A is amplifier switch 5205, relay R5205 and error lamp $L_a$. Controlled by group address error latch B is amplifier switch 5206, relay R5206 and error Lamp $L_b$. Controlled by group address error latch C is amplifier switch 5207, relay R5207 and error lamp $L_c$.

Referring to Fig. 5, shown within a broken line is a block diagram and external connections of a single pulse generator. The detailed circuit of the single pulse generator is shown in Figs. 8 and 8C and is disclosed in detail earlier herein. At this point, it is well to point out that under control of the count Modulo 2 pushbutton or the CRT check reset pushbutton the single pulse generator will emit a single accurately timed pulse of one microsecond duration. The timing of this one microsecond pulse and its utilization will appear more clearly from a detailed description that follows.

Now still referring to Fig. 5, and shown within a broken line labelled accordingly, is the Modulo 2 control latch. The Modulo 2 control latch includes And circuit 5150, Or circuit 5164 and delay circuit 5172. Now from an inspection of Figs. 3 and 5, it is seen that the Modulo 2 control latch is substantially identical to the Modulo 4 error latch explained earlier herein. Thus it is deemed unnecessary to explain how the Modulo 2 control latch functions.

Now referring to Fig. 6, a Modulo 2 latch for the 1 bit of the first digit position (DL1–1) is shown in relative detail. Actually as pointed out earlier, there are sixty-six of these Modulo 2 latches, one for each data line. The Modulo 2 latch for the 2 bit of the first digit position (DL1–2), the Modulo 2 latch for bit 65 (DL17–1) and the Modulo 2 latch for bit 66 (DL17–2) are respectively represented by the labelled blocks in Fig. 6. Each of the sixty-six Modulo 2 latches function in identical manner in response to their respective data lines. A single Modulo 2 latch, and the sixty-six Modulo 2 latches as a group, were described in detail earlier herein.

The octal cycle: Throughout this specification the term "octal cycle" and various times within an octal cycle will be represented in appreviated form. In addition to the explanation of said terms hereinafter, reference is made to the U. S. patent application Serial No. 444,253 of W. J. Deerhake et al., filed on July 19, 1954.

Briefly, an octal cycle consists of eight microseconds. The first microsecond of an octal cycle is N.0 time and is the time interval between N.0 and N.1. Correspondingly, the second microsecond of an octal cycle referred to as N.1 time is the time interval between N.1 and N.2. Correspondingly, N.2, N.3, N.4, N.5, N.6 and N.7 repectively refer to the third, fourth, fifth, sixth, seventh and eighth microseconds of an octal cycle. It follows then, that N1.0, N1.1 and N1.2, N1.3, N1.4, N1.5, N1.6 and N1.7 time correspond respectively to the first through eighth microseconds of a second octal cycle. Thus N2.0 time would be the first microsecond of a third octal cycle.

An octal cycle of eight microseconds' duration is chosen because of the mode of operation of the storage unit represented by block D3750 in Fig. 2A. It will be appreciated that although the present embodiment of the novel checking circuit will be disclosed on the basis of an octal cycle of eight microseconds, a cycle of duration other than eight microseconds is within the scope of the present invention.

Earlier herein it was pointed out that a regeneration interval (one address) of storage unit D3750 consisted of eight microseconds. Thus it is now apparent that a regeneration interval of the storage unit represented by block D3750 is of equal time duration to an octal cycle.

Further, it is to be appreciated that when information is being accepted from the data lines by the storage unit D3750, this information will appear on the data lines during N.4 time or the fifth microsecond of an octal cycle. Correspondingly, when information is being read out or withdrawn from storage unit D3750 it will appear on the data lines during N.5 time or the sixth microsecond of an octal cycle.

The afore-recited statements will appear more clearly from the following example. Assume that during a particular regeneration interval of the storage unit D3750, address 606 is being regenerated. Then during N.5 time of this eight microsecond regeneration interval, the word stored at address 606 in storage unit D3750 will appear on the sixty-six data lines.

Now assume that during a subsequent octal cycle, information, namely a word, is to be read into storage unit D3750. This word, that is to be read into storage must appear on the data lines during N.4 time of the octal cycle during which it is to be accepted for storage. (The structure for accomplishing the impressing of the word on the data lines during N.4 time is not herein disclosed as it forms no part of the present invention. This structure could take the form of electronic storage registers, magnetic tapes, etc., synchronized with storage unit D3750.) Further, the word that was stored at the address at which the new word is to be stored will be Read-Out (i. e., appear on the data lines) at N.5 time of the same octal cycle during which the new word was Read-In.

The visual cathode ray tube error apparatus represented by the block D261 in Fig. 2A is shown in detail in Figs. 9 and 10 of the drawing. Figs. 9 and 10 of the drawing are to be joined together in the manner shown in Fig. 9A. The circuitry shown in Figs. 9 and 10 of the drawing is very similar to that of Figs. 19E and 19G, respectively, of U. S. patent application Serial No. 444,253.

As stated earlier, and shown in Fig. 2A, terminals TSA2, TSB2, TSC2 and TSD2 are respectively connected to terminals TSA, TSB, TSC and TSD of the afore-recited U. S. patent application. In Fig. 9 of the drawing, it will be seen that terminals TSA2 through TSD2 are respectively connected to input terminals 10B of And circuits 620*a*, 621*a*, 622*a* and 623*a*. Still referring to Fig. 9, it will be seen that terminal 5219A is connected via lead 991 to the input terminals 10A of each of the following And circuits: 620*a*, 621*a*, 622*a* and 623*a*. It will now be appreciated that when terminal 5219A is Up simultaneously with terminal TSA2 then And circuit 620*a* will be energized. When And circuit 620*a* is energized, the beam in visual indicator tube VIA will be unblanked and will illuminate a small spot on the screen of said indicator tube. Correspondingly, when terminal 5219A and terminal TSB2 are simultaneously Up, And circuit 621*a* will be energized and the beam in visual indicator tube VIB will be unblanked. This same relationship exists as to terminal 5219A, terminal TSC2, And circuit 622*a* and visual indicator tube VIC; and as to terminal 5219A, terminal TSD2, And circuit 623*a* and visual indicator tube VID. The manner in which the circuitry interposed between the control grids of the four indicator tubes and the four And circuits, namely, 620*a* through 623*a*, functions is discussed in detail in U. S. patent application Serial No. 444,253.

It will suffice for an understanding of the present invention to merely appreciate that only one of the And circuits 620*a* through 623*a* will be energized at any time and that the particular And circuit energized will be determined by the coincidence of terminal 5219A being in the Up condition when one of the terminals TSA2 through TSD2 is in the Up condition.

Briefly, terminal TSA2 will be Up when storage unit D3750 is at an address contained within the A tube of the sixty-six CRT storage boxes. Correspondingly, terminals TSB2, TSC2 and TSD2 will respectively be in the Up condition when storage unit D3750 is at an address in the B, C and D tubes of the sixty-six CRT storage boxes.

Referring to Fig. 10, it will be observed that terminals HL and HR effectively connect in parallel the horizontal deflection plates of the four visual indicator tubes. Terminals VU and VL effectively connect in parallel the vertical deflection plates of the four visual indicator tubes. The horizontal deflection potential impressed on terminals HL and HR is identical to that impressed on the horizontal deflection plates of the cathode ray tubes of the sixty-six CRT storage units contained within storage unit D3750. The vertical deflection potential impressed on terminals VU and VL is identical to that impressed on the vertical deflection plates of the cathode ray tubes of the sixty-six CRT storage units contained within storage unit D3750. The horizontal and vertical deflection potentials impressed on terminals HL, HR (Fig. 10) and terminals VU and VL (Fig. 10) respectively may be obtained by connecting to the proper terminals of the cathode ray tube storage system disclosed and claimed in U. S. patent application, Serial No. 444,253.

It will now be appreciated that when terminal TSA2 is Up (i. e., when storage unit D3750 is at an address in the A tubes), since the same horizontal and vertical potentials are the same as impressed on the deflection plates of the visual indicator tube VIA as on the deflection plates of the sixty-six A tubes (of D3750), that when terminal 5219A goes Up (resulting in the beam of indicator tube VIA being unblanked) a spot on the screen of said visual indicator tube will be illuminated. The illuminated spot on the face of indicator tube VIA will be at a location corresponding to the address of the word stored in the A tubes.

Correspondingly, when the cathode ray tube storage unit D3750 is at an address in the B tubes, a visual spot will appear on the face of indicator tube VIB in a position corresponding to the address of the word stored in the B tubes. In like manner, an illuminated spot on the face of indicator tubes VIC or VID respectively, indicates that storage unit D3750 is at an address of a word within the C tubes or the D tubes, respectively.

Briefly, terminal 5219A will go Up once during every eight microsecond cycle and will result in an illuminated spot appearing on the indicator tube (and at a location on the face of the indicator tube) corresponding to the address at which the storage unit D3750 is regenerating or introducing into storage a word.

It will be recalled that storage unit D3750, in the absence of an action cycle, is continuously regenerating its entire contents; that to regenerate or refresh a single word, requires eight microseconds. Hereinafter it will be shown how, during each eight microsecond regeneration interval, terminal 5219A is simultaneously in the Up condition with one of the tube selector terminals, namely, TSA2 through TSD2. The phosphor screens of the visual indicator tubes are of such persistency that a pattern of illuminated spots will appear on each indicator tube. The pattern of the illuminated spots on the visual indicator tubes as pointed out earlier is indicative of the address locations of words stored in storage unit D3750. As explained in detail hereinafter, when an error is detected in a word, a second illuminated spot closely positioned to the illuminated spot corresponding to the address of the erroneous word will appear on the screen of the appropriate visual indicator tube. That is, if an error is detected in a word stored at an address in the A tubes, a double dot will appear at the corresponding position on the face of visual indicator tube VIA.

*Specific example of operation.*—Referring to Fig. 3 of the drawing, if an error is sensed by the Modulo 4 checking circuit (U. S. patent application Serial No. 434,548) and the error is of the greater-than-9 variety, terminal T523 of Fig. 3 is Up during N.6 time of the octal cycle in which the error occurred. This N.6 time error pulse appearing on terminal T523 will be impressed via lead 900 on input terminal 19B of And circuit 5194. Lead 901 connects input terminal 19A of And circuit 5194 to terminal 386 of Fig. 10A of the drawing of U. S. patent application Serial No. 444,253. This terminal 386 of the afore-recited patent application is Up during N.6 time of every octal cycle. Thus during N.6 time of the octal cycle in which the greater-than-9 error is detected, both input terminals 19A and 19B of And circuit 5194 will be Up and the output terminal 31 of said And circuit will also be Up.

From Figs. 3 and 4 of composite Fig. 7, it will be seen that when And circuit 5194 is energized, junction point 5195A will be Up. (Junction point 5195A is connected via lead 903 to output terminal 31 of And circuit 5194 and via lead 904 to input terminal 43B of Or circuit 5192.)

Now referring to Fig. 3, it will be seen that when CRT check reset pushbutton is undepressed a positive potential of 10 volts is impressed via lead 905, a resistor R, lead 906 and lead 907, on input terminal 19A of And circuit 5193 of the Modulo 4 error latch. It will now be appreciated that when terminal 5195A is Up during N.6 time, that at N.7 time both input terminals 19A and 19B of And circuit 5193 will be Up resulting in the Modulo 4 error latch, latching. That is, the Modulo 4 error latch will remain energized until input terminal 19A of And circuit 5193 is switched to the Down condition. When the Modulo 4 error latch is energized amplifier switch 5190 and relay R5190 are energized. When relay R5190 is energized, error lamp $L_{er}$ is energized indicating that the Modulo 4 checking circuit represented by block D4474 (Fig. 2A) has detected either a Modulo 4 error or a greater-than-9 error. In this example a greater-than-9 error.

From Figs. 3 and 4, it will be seen that when junction point 5195A is Up lead 908 is Up. When lead 908 is Up the following terminals are respectively in the Up condition: terminal 58 of cathode follower 5220; terminal 301A of group address error latch A; terminal 301A of group address error latch B; terminal 301A of group address error latch C; and terminal 301A of group address error latch D. Now viewing the upper portion of Fig. 4, there will be seen four terminals labelled respectively, TSA1, TSB1, TSC1 and TSD1. These four terminals are respectively connected through connections (not shown in Fig. 4) to terminals TSA, TSB, TSC and TSD of Fig. 19E of U. S. patent application Serial No. 444,253.

Now from Fig. 4 of the drawing, it will be seen that terminals TSA1, TSB1, TSC1 and TSD1 are respectively connected through leads 910, 911, 912 and 913 to terminals 300A of group address error latches A, B, C and D respectively.

Terminals TSA, TSB, TSC and TSD are tube selector terminals. Terminal TSA will be Up when the storage unit represented by block D3750 of Fig. 2A is at any even address from 0–998, that is, when at the address of a word stored within the A tubes of the sixty-six CRT boxes of storage unit D3750. Terminal TSB of storage unit D3750 will be Up when the storage unit represented by block D3750 of Fig. 2A is at any odd address from 1–999, that is, when at the address of a word stored within the B tubes of the sixty-six CRT boxes of storage unit D3750. Terminal TSC of storage unit D3750 will be Up when the storage unit represented by block D3750 of Fig. 2A is at any even address from 1000–1998, that is, when at the address of a word stored within the C tube of the sixty-six CRT boxes of storage unit D3750. Terminal TSD of storage unit D3750 will be Up when the storage unit represented by block D3750 of Fig. 2A is at any odd address 1001–1999, that is, when at the address of a word stored within the D tube of the sixty-six CRT boxes of storage unit D3750.

Now it will be seen that only one of the terminals TSA, TSB, TSC and TSD (of storage unit D3750) will be Up at a time and correspondingly only one of the terminals TSA1, TSB1, TSC1 and TSD1 will be Up at a time. As was pointed out earlier when junction 5195A is Up, terminal 300A of each of the four group address error latches is Up. Thus coincidence will occur at one of the four two-position switches. Let us assume that the greater-than-9 error occurred (that resulted in terminal T523 of Fig. 1 being Up) in a word read from address 961. Hence terminal TSB1 will be Up and coincidence will occur (terminals 300A and 301A of two position switch 5198 simultaneously Up) resulting in group address error latch B being energized. When group address error latch B is energized, amplifier switch 5206 and relay R5206 will be energized. When relay R5206 is energized, group address error lamp $L_b$ will be energized indicating that the address at which the erroneous word is stored is physically located in the B tubes (of the sixty-six CRT storage boxes).

When the Modulo 4 error latch is energized as a result of the Modulo 4 checking circuit detecting an error, then the output of the delay circuit 5191 (Fig. 3) will be Up and this condition via lead 914 and terminal 661.71 will manifest to the calculator (and/or other apparatus) that an error has been detected.

When a greater-than-9's error is detected by the Modulo 4 checking circuit, junction terminal 5195A is Up for one microsecond. When terminal 5195A is Up, lead 908 is Up and thus the input terminal 58 of cathode follower 5220 is Up and the output terminal 63 of said cathode follower will be Up for one microsecond. Terminal 5219 is connected via lead 909 to output terminal 63 of cathode follower 5220 and to output terminal 63 of cathode follower 5209. Terminal 5219 is connected to terminal 5219A of the visual CRT indicator apparatus represented by block D261 and shown in detail in Figs. 9 and 10.

Essentially, terminal 5219A of the visual CRT indicator apparatus will be Up when either of the output terminals of cathode followers 5220 and 5209 is Up. This terminal (5219A) when in the Up condition will unblank the beam in one of the four cathode ray tubes of the visual CRT indicator. That is, if terminal 5219A is Up simultaneously with terminal TSA2 of the visual CRT indicator, then the beam of tube VIA will be unblanked. Correspondingly, if terminal 5219A is Up simultaneously with each of the remaining terminals TSB2, TSC2 and TSD2, the beam will be unblanked in the corresponding cathode ray tubes, namely, VIB, VIC and VID.

Now referring to Fig. 4 once more, it will be seen that the input terminal of cathode follower 5209 is connected via lead 915 and terminal T704 to terminal 704 of the storage unit represented by block D3750 of Fig. 2A. Terminal 704 of the storage unit is shown in Fig. 19D of U. S. patent application Serial No. 444,253. Terminal 704 will receive an On pulse during each eight microsecond interval. This On pulse occurring during each octal cycle will result in terminal 704 (D3750), and therefore terminals T704 and 5219, being Up during N.4 to N.44 time of each octal cycle.

The "On" pulse appearing at terminal T704 (Fig. 4) during N.4 to N.44 time of each octal cycle is impressed via lead 915, cathode follower 5209, lead 909 and terminal 5219 on terminal 5219A (Fig. 9) of the cathode ray tube visual indicator apparatus. As explained earlier, herein, the coincidence (both terminals in the Up condition) of terminal 5219A and one of the tube selector terminals TSA2 through TSD2 (Fig. 9) will result in an illuminated spot on the face of the appropriate visual indicator tube. Actually, a pattern of illuminated spots will appear on each of the visual indicator tubes VIA through VID. The pattern of illuminated spots on the face of visual indicator tube VIA will correspond to the address locations of the words stored in the A tubes. Correspondingly, the patterns of visual indicator tubes VIB, VIC and VID will respectively correspond to the address locations of the words stored in the B, C and D tubes.

It was shown earlier herein how, as a result of an error being detected in the word stored at address 961 (i. e., B tubes), junction terminal 5195A will be Up at N.6 time during the eight microsecond cycle necessary to regenerate the word stored at address 961.

Now as stated earlier herein and as explained in detail in U. S. patent application Serial No. 444,253 the words stored within storage unit D3750 are, in the absence of an action cycle, constantly in serial order being refreshed. Now as explained earlier, the On pulses that appear at terminal T704 of Fig. 4 result in a pattern of illuminated spots appearing on the face of each of the visual indicator tubes. These On pulses are of four tenths of a microsecond duration and occur from N.4 to N.44 time. (It is to be appreciated that the duration of the "On" pulse is not critical and means for increasing its duration are well known.)

The error pulse appearing at junction terminal 5195A at N.6 time of the regeneration cycle during which address 961 is regenerated, will be impressed via lead 908, cathode follower 5220, lead 909 and terminal 5219 on terminal 5219A of the cathode ray tube visual indicator apparatus shown in Figs. 9 and 10. This error pulse will result in a second illuminated spot slightly displaced from the illuminated spot resulting from the On pulse during the regeneration of address 961 appearing on the screen of visual indicator VIB. In other words, two closely positioned illuminated spots will appear on the face of visual indicator tube VIB at a location corresponding to address 961. The illuminated spot indicative of an error is slightly displaced from the illuminated spot indicative of the error address, since the sweep potential of the cathode ray tubes (i. e., visual indicators) is a function of time.

The double spot appearing on the face of cathode ray tube visual indicator VIB at a location corresponding to address 961 will continue to be visible to the operator since in the absence of correction the error will be repeatedly detected and an error pulse generated to illuminate the second spot. A judicious choice of screen material for the visual indicator tubes is necessary to obtain the proper persistency of illumination.

The operator by viewing the visual CRT indicator, can determine the address of the word that contains erroneous information. However, the operator cannot, from viewing the error indicating lamps $L_a$ through $L_d$ nor the visual CRT indicators VIA through VID determine in which of the sixty-six CRT boxes of storage unit D3750 the erroneous bit is stored (i. e., the erroneous replacing of a binary "0" by a binary "1" or vice versa). It will be recalled as stated earlier that each of the sixty-six CRT boxes correspond to a data line.

In order for the operator to determine in which of the sixty-six CRT storage boxes the erroneous bit is stored, it will be necessary to have the entire contents (address 0 through address 1999) accepted for a second time by the Modulo 2 latches. This can be accomplished by depressing the count Modulo 2 pushbutton shown in Fig. 3.

Assuming that the operator depresses the count Modulo 2 pushbutton of Fig. 3, the circuitry brought into action as a result thereof will now be described in detail. Reference is made to Figs. 3, 5, and 6 of composite Fig. 7. The depressing of the count Modulo 2 pushbutton, as explained earlier, will result in the energization of relay R5132. When relay R5132 is energized, terminal 538A of single pulse generator 5143 is effectively connected to ground through lead 917, resistor 916 and the grounded transfer contact of relay R5132. From an earlier discussion of the single pulse generator (shown in Figs. 8 and 8C and represented by the block shown in Fig. 8D), it will be recalled that when terminal 538A is grounded latches 530 and 531 are de-energized. Prior to the energization of relay R5132, terminal 538B is grounded through lead 919, resistor 918 and the ground transfer contact of relay R5132.

Now when the count Modulo 2 pushbutton is released, relay R5132 will drop out and thus terminal 538B of the single pulse generator 5143 will be grounded. When terminal 538B of the single pulse generator is grounded input terminals 19B and 19A of And circuit 523 and 525, respectively (of the single pulse generator) will be Up.

Now referring to Fig. 5, it will be seen that terminals 521 and 522 of the single pulse generator are connected in common through lead 920 to terminal 385 of Fig. 10 (of the octal pulse generator) of U. S. patent application Serial No. 444,253. Terminal 385 will be Up during N.5 time of every octal cycle. Thus the second N.5 pulse impressed on terminals 522 and 521 of the single pulse generator, occurring after terminal 538B is returned to ground potential as a result of releasing the count Modulo 2 pushbutton, will result in a single pulse at N.6 time appearing at terminal 537 of the single pulse generator.

From Fig. 5 it will be seen that the N.6 pulse emitted by the single pulse generator is impressed via lead 921 on the right input terminal of Or circuit 5180 and on the left input terminal of Or circuit 5164 This will result in both Or circuits being energized. From Fig. 5 it will be seen that the output of Or circuit 5180 is connected via lead 922, cathode follower 5181 and lead 923 to terminal 308 of Fig. 6A of U. S. patent application Serial No. 444,253.

The single pulse emitted by the single pulse generator at N.6 time and impressed via Or circuit 5180 and cathode follower circuit 5181 on terminal 308 of Fig. 6A of the aforerecited U. S. patent application, results in the regeneration counter (Figs. 6A–6D of U. S. patent application Serial No. 444,253 being cleared to the CRT address 0. The regeneration counter will now count from address 0 through address 1999 in the order recited. This will constitute one complete regeneration cycle and storage unit D3750 will refresh or regenerate all of the information stored therein. Further, the entire contents of CRT storage unit D3750 will appear on the data line terminals during the 2000 octal cycles required to regenerate all of the information stored in storage unit D3750. The reason for regenerating the entire contents of storage unit D3750 in the order of address 0 through address 1999 is to make available to the sixty-six Modulo 2 latches, the entire contents of said storage unit. In the following paragraph it will be pointed out how this is accomplished.

The one microsecond pulse emitted by the single pulse generator at N.6 time is also delivered via lead 921 to the left input terminal of Or circuit 5164. (Or circuit 5164, delay circuit 5172 and And circuit 5160 comprise the Modulo 2 control latch). Since at this time inverter 5156 is de-energized, the left input of And circuit 5150 which is connected through lead 924 to the output of said inverter circuit will be Up. Thus the N.6 pulse impressed on the left input of Or circuit 5164 energizes the Modulo 2 control latch. When the Modulo 2 control latch is energized feedback lead FB of said latch will be Up as will lead 925 which is connected between said feedback lead and the left input terminal of And circuit 5151.

Referring to Fig. 5, it will be seen that lead 920 is Up during N.5 time of each octal cycle. Further, that leads 925 and 920 are connected to the input terminals of And circuit 5151. Lead 925 is Up since the Modulo 2 control latch is energized. Lead 920 will be Up at N.5 time and thus lead 927 connected to the output of And circuit 5151 will be Up during N.5 time. Lead 927 is also connected to the input of inverter circuit 5163 and thus when said lead is Up, lead 929 which is connected to the output of said inverter circuit will be Down. Lead 929 will be Down during N.5 time as will Modulo 2 accept gate 661.18. From the earlier discussion of the Modulo 2 latches, it will be recalled that when the Modulo 2 accept gate terminal is Down during N.5 time, this will permit the sixty-six Modulo 2 latches to accept the information that appears on the sixty-six data lines during N.5 time of each regeneration interval (i. e., or read-out cycle in cases other than the conditions of this example). It will be appreciated that the Modulo 2 control latch will remain energized as long as inverter circuit 5156 (Fig. 5) is not energized.

Thus during N.5 time of each of the 2000 octal cycles required to regenerate the entire contents of storage unit D3750, the Modulo 2 accept gate (Fig. 6) will be Down to accomplish the acceptance of the word by the sixty-six Modulo 2 latches.

Referring to Fig. 5, it will be seen that lead 926 is connected to the left input terminal of Or circuit 5180 and to the input of inverter circuit 5156. Lead 926 is also connected to terminal 194 of Fig. 6D (the regeneration counter) of U. S. Patent application Serial No. 444,253. Terminal 194 of the afore-recited U. S. patent application will go Up at N.5 time of the regeneration cycle during which address 1999 is being regenerated by storage unit D3750. This N.5 pulse will result in the output of inverter circuit 5156, namely, lead 924 being Down during N.5 time and thus deenergizing the Modulo 2 control latch at N.6 time. When the Modulo 2 control latch is de-energized the N.5 pulses appearing on lead 920 will no longer result in Modulo 2 accept gate 661.18 assuming the Down condition at N.5 time of subsequent octal cycles.

Further, the N.5 pulse appearing on lead 926 when address 1999 of the CRT storage unit D3750 is being regenerated will effect through the following circuitry: Or circuit 5180, lead 922, cathode follower 5181 and lead 923 the impressing of an Up pulse on terminal 308 of Fig. 6A (regeneration counter) of U. S. Patent application Serial No. 444,253. The Up pulse impressed on terminal 308 will result in the regeneration counter of CRT storage unit D3750 being cleared to CRT address 0. (It is to be appreciated that the regeneration counter will then recount and the storage unit will regenerate or refresh all of the information in the storage unit in its normal manner in the absence of other instructions from the calculator.)

At this time the entire contents of CRT storage unit D3750 has been twice accepted by the sixty-six Modulo 2 latches shown in Fig. 7. Thus, from the earlier explanation of the Modulo 2 latches, it will be appreciated that the Modulo 2 indicator lamps corresponding to Modulo 2 latches that have accepted an even number of binary 0's will be in the Off condition whereas any Modulo 2 indicator lamp corresponding to a Modulo 2 latch that has accepted an odd number of binary 0's will be in the On condition. Further, that if the sixty-six Modulo 2 latches have twice accepted the identical information they will all be in the Off condition. Thus at this time, any Modulo 2 indicator lamps that are in the On condition are indicative of erroneous information stored within the CRT storage box corresponding to the data line to which the Modulo 2 latch (having its indicator lamp On) is responsive.

Let us assume that at this time indicator lamp IL1–2 is On. The remaining sixty-five indicating lamps are all Off. The operator, as will be recalled, from his inspection of the visual CRT indicator apparatus determined that the error was in the word stored at address 961 of the B tube. The operator, now by viewing the sixty-six indicator lamps associated with the sixty-six Modulo 2 latches and observing that indicator lamp IL1–2 is On can conclude that the erroneous bit is stored at address 961 of the B tube of the CRT box associated with data line DL1–2. That is, the erroneous bit (a binary 0 replacing a binary 1, or a binary 1 replacing a binary 0) occurred in the 2 bit position of the first digit position of the word stored at address 961.

The operator now has sufficient information at his disposal so that he can select the word of information (address 961) containing the error. Now through circuitry known in the art the operator can cause the erroneous word to be read out of the CRT storage unit D3750 and into an external electronic device such as a storing register of the general type disclosed and claimed in the Byron L. Havens et al. U. S. Patent application Serial No. 257,747, filed November 23, 1951. Now through means known in the art the operator will correct the error. Having corrected the information the operator will cause the corrected word to be restored at the same CRT address, namely, address 961. (The apparatus for withdrawing the erroneous word from storage into a register where it can be corrected and then returning the corrected word to its original address in the CRT storage unit forms no part of the present invention.)

Now, in order to get the equipment back in operating condition such that the calculator can utilize the CRT storage facilities and novel checking circuit, the sixty-six Modulo 2 latches and the various error latches which were energized must first be reset. Also, the entire contents of CRT storage unit D3750 must be accepted for a single time by the sixty-six Modulo 2 latches so that if an error is subsequently detected these sixty-six Modulo 2 latches may again be utilized in the manner described in detail hereinabove.

The operator having corrected the error would now depress the CRT check reset pushbutton shown in Fig. 3. When said pushbutton is depressed, lead 906 will go Down resulting in the de-energization or resetting of the Modulo 4 error latch. Also, when lead 906 is Down, input terminal 19A of And circuit 5196 is Down resulting in the output terminal of said And circuit and thus terminals 302A of each of the group address error latches A through D being Down. Thus group address error latch B that was energized under the conditions of this example will be reset.

The resetting of the Modulo 4 error latch and group address error latch B will respectively turn Off error lamps $L_{er}$ and $L_b$.

The depressing of the CRT check reset pushbutton also energizes amplifier switch 5133 which in turn, energizes relay R5133 causing the transfer of the contact of said relay. When the transfer contact of relay R5133 is transferred, a −35 volt potential is impressed on the Modulo 2 clear terminal 661.62 (Fig. 6) of the sixty-six Modulo 2 latches. The circuit effecting the impressing of the negative 35 volt potential on the Modulo 2 clear terminal is as follows: lead 930, the transfer contact of relay R5133, lead 931, resistor 932 and lead 933.

From the earlier discussion of the sixty-six Modulo 2 latches, it will be appreciated that when the Modulo 2 clear terminal 661.62 is in the Down condition (i. e., has impressed on it a potential of approximately −35 volts) the sixty-six Modulo 2 latches will be reset. When the sixty-six Modulo 2 latches are reset, all sixty-six of the indicator lamps associated with said latches are Off.

To briefly summarize, the depressing of the CRT check reset pushputton accomplishes the following: (1) resetting the Modulo 4 error latch; (2) resetting the group address error latches (i. e., only latch B under the conditions of this example); and (3) resetting the sixty-six Modulo 2 latches.

Referring to Fig. 3, it will be seen that when relay R5133 is energized a positive pulse is applied through Or circuit 5130 to amplifier switch 5132 so as to energize relay R5132. This positive pulse applied on the left input terminal of Or circuit 5130, as a result of relay R5132 being energized is effected through the following circuitry: lead 935, resistor 936, resistor 937 and lead 938. Now when relay R5133 is de-energized as a result of the CRT check reset pushbutton being released, the positive pulse impressed on the left input terminal of Or circuit 5130 will be terminated. This will result in relay R5132 being de-energized. The energization and de-energization of relay R5132 as a result of pressing and releasing the CRT check reset pushbutton results in the same circuit operations (sequence of events) as occurred when the count Modulo 2 pushbutton was depressed earlier herein. That is, the single pulse generator 5143 emits a positive pulse of one microsecond duration at N.6 time.

The N.6 time pulse emitted by the single pulse generator appears on terminal 537 of the single pulse generator and via lead 921 energizes the Modulo 2 control latch. This N.6 pulse also energizes Or circuit 5180 and cathode follower 5181. When cathode follower 5181 is energized, lead 923 is Up. When lead 923 is Up during N.6 time, terminal 308 of the regeneration counter (Fig. 6A of U. S. patent application Serial No. 444,253) will be Up resetting the regeneration counter to address 0.

It will be appreciated, as explained earlier, that when the Modulo 2 control latch is energized the words appearing on the data lines during N.5 time will be accepted by the sixty-six Modulo 2 latches. (It will be appreciated that when relay R5133 is energized a time interval elapses before the single pulse generator emits a single pulse as a result of relay R5132 being de-energized. This time interval is important in that it allows for resetting the necessary circuitry.)

Storage unit D3750 will now regenerate the information stored at address 0 through 1999 in the afore-recited order and this information will be accepted by the sixty-six Modulo 2 latches. At N.5 time of the eight microsecond regeneration cycle during which address 1999 is being regenerated, a positive pulse (originating or obtained from terminal 194, Fig. 6D, of the afore-recited U. S. patent application Serial No. 444,253) will be impressed via lead 926 on the input of inverter 5156 resulting in the output, namely, lead 924 of said inverter going Down and resetting or deenergizing the Modulo 2 control latch. Thus the sixty-six Modulo 2 latches will now reflect the information stored in storage unit D3750. (It will be noted that when inverter 5163 is not energized, lead 929 and the Modulo 2 accept gate terminal 661.18 will each be in the Up condition.) The N.5 pulse appearing on lead 926 will also energize Or circuit 5180 and cathode 5181 to accomplish the resetting of the regeneration counter to address 0.

It will now be appreciated that at this time the Modulo 2 control latch is de-energized, the Modulo 4 error latch is reset, group address error latches A–D are all reset, and the sixty-six Modulo 2 latches have accepted the information stored in storage unit D3750 a first time. Thus the calculator may now proceed and utilize the storage unit (and the associated checking circuit) in normal fashion. It will be appreciated that storage unit D3750, is in the absence of an action cycle, or cycles, constantly regenerating the words stored in said storage unit. How this is controlled and accomplished is disclosed in detail in U. S. patent application Serial No. 444,253 filed on July 19, 1954, and entitled "Cathode Ray Tube Storage."

At this point, it will be apprciated by those skilled in the art that in order for the novel checking circuit herein disclosed and claimed to be effectively employed, means must be provided such that whenever information is first introduced into storage, or removed from storage, the sixty-six Modulo 2 latches reflect the entry of new words or the removal of words. This is necessary in order that the sixty-six Modulo 2 latches may at a subsequent time (when an error is detected) be called into play in the manner set forth in detail hereinabove. It will be recalled that when a word is to be read into storage unit D3750 it will appear on the sixty-six data lines at N.4 time, and when a word is to be read out of storage, it will appear on the sixty-six data lines at N.5 time.

Referring to Fig. 5 it will be seen that leads 939 and 920 are respectively connected to terminals 384 and 385 of the octal counter of Fig. 10 of U. S. patent application Serial No. 444,253. Thus leads 939 and 920 are respectively Up at N.4 and N.5 time of each octal cycle. Further, it will be seen that leads 939 and 920 are connected to the two input terminals of Or circuit 5159 resulting in the output, lead 941, of said Or circuit being Up during N.4 and N.5 time of each octal cycle. Now still referring to Fig. 5, it will be seen that lead 940 is connected to terminal 43B of Or circuit 605 of Fig. 19D of U. S. patent application Serial No. 444,253. This terminal of the afore-recited U. S. patent application has impressed on it the video blank gate pulse and will be Up during N.4 to N1.0 time of each and every write cycle. A write cycle being defined, for purposes of explanation only herein, as an eight microsecond cycle during which a new word is being accepted for storage via the sixty-six data lines by storage unit D3750, or a word is being erased from storage in storage unit D3750.

Now it will be appreciated that leads 940 and 941 are connected to the two input terminals of And circuit 5160 and that during a write cycle said And circuit will be energized and thus lead 928 will be in the Up condition during N.4 and N.5 time of said cycle. With lead 928 in the Up condition during N.4 and N.5 time of a write cycle, the input of inverter 5163 will be Up during said intervals and the output of said inverter, namely, lead 929 will be Down during said intervals; said intervals being N.4 and N.5 time of the write cycle. Thus when lead 929 is Down during N.4 and N.5 time of a write cycle Modulo 2 accept gate terminal 661.18 will be Down permitting the new word that is to be introduced into storage (that appears on the data lines at N.4 time of the write cycle) to be accepted by the sixty-six Modulo 4 error latches, and the word that is permanently withdrawn from storage (and appears on the data lines at N.5 time of the write cycle) to be accepted by the sixty-six Modulo 2 latches.

Now referring to Figs. 3 and 4 of composite Fig. 7, it will be appreciated that the operator can, at any time, reset the group address error latches by merely depressing the group address reset pushbutton. When the group address reset pushbutton is depressed, lead 942 will be Down as it will be connected through said pushbutton to a —35 volt potential. When lead 942 is Down, input terminal 19B of And circuit 5196 is Down and thus the output terminal of said And circuit and lead 929 will be Down. When lead 929 is Down, it will effectively accomplish the resetting of the group address error latches A through D. (Lead 929 interconnects output terminal 31 of And circuit 5196 and terminals 302A of each of the group address error latches.)

Still referring to Fig. 3 and from the earlier discussion of the sequence of events that followed the depressing of the count Modulo 2 pushbutton, it will be appreciated that the operator can depress said pushbutton and accomplish the acceptance of the entire contents of storage unit D3750 by the sixty-six Modulo 2 latches.

It will be appreciated that after the operator believes he has corrected an error and the Modulo 2 latches have accepted the contents of storage unit D3750 a first time, the operator may depress the count Modulo 2 pushbutton to have the sixty-six Modulo 2 latches accept the entire contents of storage unit D3750 a second time. From the earlier detailed discussion, it will now be appreciated that when the sixty-six Modulo 2 latches have accepted the information stored in storage unit D3750 twice, all of the indicator lamps should be Off in the absence of an error.

When the Modulo 2 reset pushbutton shown in Fig. 3 is depressed, amplifier switch 5134 and relay R5134 will be energized. When relay R5134 is energized, the Modulo 2 clear gate terminal 661.63 (Fig. 6) will be Down. When the Modulo 2 clear gate terminal is Down, the entire sixty-six Modulo 2 latches will be reset. The circuitry that accomplishes the impressing of a Down pulse on said Modulo 2 clear terminal is as follows: lead 930, the transfer contact of relay R5134, lead 943, resistor 944 and lead 933. Thus it is seen that the depressing of the Modulo 2 reset pushbutton resets the sixty-six Modulo 2 latches.

*Second example of operation.*—In the preceding example the illustrative error was arbitrarily chosen to be of the greater-than-9 variety detected by the Modulo 4 checking circuit represented by block D4474 in Fig. 2A. In this example, the illustrative error will be of the Modulo 4 variety detected by the Modulo 4 checking circuit. When a Modulo 4 error is detected in a word by the Modulo 4 checking circuit, terminal E620 (Fig. 2A) will be Up at N.7 time. Terminal E620 of the Modulo 4 checking circuit is connected to terminal T620 of Fig. 3 of composite Fig. 7. Now referring to Fig. 3, it will be seen that lead 945 connects terminal T620 to the right input of And circuit 5195 and lead 946 connects the left input of said And circuit to terminal 387 (of the octal counter) of Fig. 10 of U. S. patent application Serial No. 444,253. Terminal 387, and thus lead 946, will be Up at N.7 time of each and every octal cycle. Thus when a Modulo 4 error is detected, leads 945 and 946 will be simultaneously Up at N.7 time resulting in And circuit 5195 being energized. When And circuit 5195 is energized the output of said And circuit, namely, lead 947 is Up and since this lead is connected to junction terminal 5195A, said terminal will be Up. (It will be recalled here that in the earlier example, And circuit 5194, when a greater-than-9's error was detected, resulted in junction terminal 5195 being Up at N.6 time.)

The Up pulse appearing at junction terminal 5195A at N.7 time will result in the energization of the Modulo 4 error latch. The N.7 pulse appearing at junction terminal 5195A will also result in one of the group address error latches being energized.

Let us assume that the word containing the Modulo 4 error is stored at address 1016 which is in the C tubes of storage unit D3750. Then the N.7 pulse will coincide with terminal TSC1 (Fig. 4) being in the Up condition and group address error latch C will be energized. Thus group address error lamp $L_c$ will be turned On. The N.7 pulse that appears at terminal 5195A will also be impressed via lead 908, cathode follower 5220, lead 909 and terminal 5219 on terminal 5219A (Fig. 10) of the visual CRT indicator apparatus and result in a second illuminated spot appearing closely positioned to the spot corresponding to address 1016 on the screen of visual CRT indicator VIC. (It will be recalled that the On pulse obtained from storage unit D3750 and impressed via lead 915, cathode follower 5209, lead 909, terminal 5219 and terminal 5219A of the visual CRT indicator apparatus of Figs. 9 and 10 results in the illuminated spot patterns corresponding to the address positions appearing on the screens of visual indicator tubes VIA, VIB, VIC, and VID.)

It will now be apparent that the operator, by observing that group address error lamp $L_c$ is On will be appraised of the fact that the erroneous word (word containing one or more erroneous bits) is stored at an address in the C tube. The operator now can proceed as stated in detail in the preceding example. He may press and release the count Modulo 2 pushbutton and observe which Modulo 2 indicator lamp (or lamps) are On after the sixty-six Modulo 2 latches have twice accepted the information stored in storage unit D3750. Let us assume that Modulo 2 indicator lamp DL6-1 is On after the count Modulo 2 pushbutton has been depressed and released.

The operator will now be able to conclude the following as to the error: (1) by observing that group address error lamp $L_c$ is On the operator knows that the erroneous word is stored at a C address, i. e., address stored with C tubes; (2) by observing the illuminated spot pattern of visual CRT indicator VIC and observing that two closely positioned illuminated spots appear at the location corresponding to address 1016 the operator can conclude that the erroneous word is stored at address 1016; and (3) the operator by observing that Modulo 2 indicator lamp IL6-1 is On can conclude that the erroneous bit (a binary 1 changed to a binary 0, or a binary 0 changed to a binary 1) occurred in the 1 bit position of the sixth digit position of the word, i. e., data line DL6-1.

Now the operator, through apparatus not herein disclosed, can effect the correction of a word and return it to its proper address in CRT storage unit D3750.

Then from the discussion of the prior example, the operator may depress the CRT check reset pushbutton to put the novel checking circuit (herein disclosed and claimed) back into operation.

However, it is to be recalled, that if the operator for any reason desires, he may depress and release the group address reset pushbutton to merely reset the group address error latches. Likewise the operator may merely depress and release the Modulo 2 reset pushbutton to merely reset the sixty-six Modulo 2 latches. Further, the operator may find occasion after having corrected the error to depress and release the count Modulo 2 pushbutton to effect the acceptance of the entire contents of storage unit D3750 a single time by the sixty-six Modulo 2 latches. It will be appreciated that if the count Modulo 2 pushbutton is twice depressed and released, the entire contents of storage unit D3750 will be twice accepted by the sixty-six Modulo 2 latches.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cathode ray tube storage system wherein the information in binary notation stored therein is periodically regenerated, first means cooperating with said storage system for during regeneration detecting an error in the binary notation of any one of a plurality of portions of said information and additional means cooperating with said first means and said storage system for visually indicating where an erroneous portion of the information is stored.

2. A checking circuit for use in conjunction with a cathode ray tube storage system capable of storing a plurality of multi-digit words, each word being expressed in coded notation and stored at a discrete address in said storage system, first means cooperating with said storage system for detecting an error in the coded notation of any one of said plurality of words, and additional means cooperating with said storage system and said first means for indicating the discrete address of the erroneous word.

3. A checking circuit for use in conjunction with a storage device having stored therein a plurality of binary bits of information including first means cooperating with said storage device for detecting an erroneous bit of information stored in said storage device and additional means cooperating with said storage device and said first means for rendering a visual indication of the location within said storage device of the erroneous bit of information detected by the first means.

4. A checking circuit for use in conjunction with a cathode ray tube storage system wherein words in binary notation are accepted in parallel by bit order for storage, each at a discrete address, and are subsequently available in parallel by bit order by said storage system, said checking circuit including first means cooperating with said storage system for detecting an error in the binary notation of a word made available from storage by said storage system, second means responsive to said first means and said storage system for rendering a visual indication of the address of an erroneous word and additional means cooperating with said storage system and said first and second means for indicating the particular binary bit in error within any erroneous word.

5. A checking circuit of the type claimed in claim 4 further characterized in that said second means is capable of simultaneously indicating the respective addresses of a plurality of erroneous words.

6. A checking circuit of the type claimed in claim 5 further characterized in that said additional means is capable of respectively indicating the particular bits in error when a plurality of erroneous words have been detected.

7. A checking circuit for use in conjunction with a storage system adapted to store a plurality of multi-digit words and wherein said storage system consists of a plurality of similar portions each portion storing a designated part of each of said plurality of words, first means cooperating with said storage system for detecting an error in any one of said plurality of words and second means responsive to said storage system and said first means for visually indicating the relative location of an erroneous word within said plurality of portions of said storage system.

8. A checking circuit as claimed in claim 7 further characterized in that additional means responsive to said storage system and said first and second means is provided for indicating in portion of said storage system the part of the word containing the error is stored.

9. A checking circuit for use in conjunction with a cathode ray tube storage system adapted to store a plurality of multi-digit words in a plurality of CRT units, each word being expressed in binary bits, and each unit storing only a designated binary bit of each word and including a plurality of cathode ray tubes, first means cooperating with said storage system for checking and rendering a signal if an erroneous binary bit is found in any of said plurality of words, second means responsive to a signal from said first means cooperating with said storage system for visually indicating the location within said plurality of CRT units of an erroneous word, and third means cooperating with said first and second means and said storage system for indicating the particular CRT unit wherein an erroneous binary bit contained within an erroneous word is stored.

10. A checking circuit as claimed in claim 9 wherein said first means includes a Modulo 4 check and a greater-than-9 check of each multi-digit word.

11. A checking circuit as claimed in claim 10 wherein said second means includes a Modulo 4 error latch, a plurality of group address error latches and visual CRT indicator means.

12. A checking circuit as claimed in claim 11 wherein said third means includes a single pulse generator, a Modulo 2 control latch, and a plurality of Modulo 2 latches.

13. In a cathode ray tube storage system wherein words in binary-decimal notation are stored and repeatedly regenerated in parallel by bit order and in which each of said words is respectively stored at a discrete address therein, a checking circuit cooperating with said storage system and including first means for visually indicating the address of the word being regenerated, second means for detecting an erroneous binary bit in any of said regenerated words, and means cooperating with said first means and responsive to said second means for indicating the address of a word containing an erroneous binary bit.

14. In a cathode ray tube storage system of the type claimed in claim 13 further characterized in that even-odd means is provided for visually indicating the position of the erroneous binary bit within the word found to contain said erroneous binary bit.

15. In a checking circuit for use in conjunction with a cathode ray tube storage system wherein a plurality of multi-digit words expressed in binary notation are respectively stored at discrete addresses therein, checking means for checking the accuracy of the binary notation of each of said words, visual indicator means including a plurality of cathode ray tubes, circuit means cooperating with said storage system and said checking means for controlling said visual indicator means in such a manner that the address of a word found to contain an inaccuracy in its binary notation will be manifested by the physical displacement of an illuminated spot on the face of one of said plurality of cathode ray tubes.

16. A single pulse generator adapted to emit a single pulse of fixed duration at a predetermined time in an arbitrary cycle, including an input terminal, an output terminal, a first And circuit, a first latch circuit, a second And circuit, a delay circuit, an inverter circuit and a second latch circuit, means coupling said first And circuit to said first latch circuit and said first latch circuit to said second latch circuit, means coupling said input terminal to said second And circuit and said second And circuit to said delay circuit, means coupling said delay circuit to said second latch circuit and said output terminal, and said second latch circuit to said inverter circuit and means coupling said inverter circuit to said second And circuit.

17. A single pulse generator capable of emitting a single pulse of fixed duration at a predetermined time in an arbitrary cycle, including a first latch consisting of an And circuit and a delay circuit, and a second latch controlled by said first latch and consisting of an And circuit, an Or circuit and a delay circuit and additional circuit means interconnecting said first and second latches and consisting of an And circuit, a delay circuit, and an inverter circuit.

18. A single pulse generator adapted to emit a single pulse of fixed duration at a predetermined time in an arbitrary cycle, including a first And circuit, a first latch circuit coupled to said first And circuit in such a manner that when said first And circuit is energized said first latch circuit will also be energized, a second And circuit, a delay circuit serially connected to said second And circuit, a second latch circuit coupled to said delay circuit in such a manner that when said delay circuit is energized said second latch circuit will be energized provided said first latch circuit is energized and means coupling said second latch circuit to said second And circuit.

19. A circuit including in combination a potentiometer-switch and a single pulse generator as claimed in claim 18, said switch being operable to assume either one of two conditions and to thereby control the operation of said single pulse generator.

20. A visual error indicator for use in conjunction with cathode ray tube storage means wherein a plurality of multi-digit words expressed in binary notation are stored therein at discrete addresses, and checking circuit means wherein the accuracy of the binary notation of each of said words is repeatedly checked, said visual error indicator including a plurality of cathode ray tubes, circuit means interconnecting said storage means and said indicator whereby an illuminated pattern corresponding to the address location of the words stored in said cathode ray tube storage means will appear on the faces of said cathode ray tubes of said visual error indicator, and additional means responsive to said checking circuit means for varying the illuminated pattern appearing on the faces of said plurality of cathode ray tubes of said visual error indicator so as to designate the address of any of said words wherein the binary notation was found to be inaccurate by said checking circuit means.

References Cited in the file of this patent

UNITED STATES PATENTS

| | | |
|---|---|---|
| 2,634,052 | Bloch | Apr. 7, 1953 |
| 2,674,727 | Speilberg | Apr. 6, 1954 |
| 2,679,638 | Bensky et al. | May 25, 1954 |
| 2,684,199 | Starreveld | July 20, 1954 |
| 2,685,683 | Holden et al. | Aug. 3, 1954 |
| 2,693,593 | Crosman | Nov. 2, 1954 |

U. S. DEPARTMENT OF COMMERCE

PATENT OFFICE

CERTIFICATE OF CORRECTION

Patent No.2,826,359 William J. Deerhake et al. March 11, 1958

It is hereby certified that error appears in the printed specification of the above numbered patent requiring correction and that the said Letters Patent should read as corrected below.

Column 1, line 27, for "of facilitates" read -- or facilitates --; column 10, line 51, for "relay circuit" read -- delay circuit --; column 23, line 65, for "addresses" read -- address --; column 25, line 47, for "200 addresses" read -- 2000 addresses --; column 32, line 42, for "appreviated" read -- abbreviated --; column 38, line 72, for "gate 661.18" read -- gate terminal 661.18 --; column 45, line 24, for "in portion" read -- in which portion --.

Signed and sealed this 17th day of June 1958.

(SEAL)
Attest:

KARL H. AXLINE

Attesting Officer

ROBERT C. WATSON

Commissioner of Patents